INVENTOR.
Clifford T. Hultin
BY
Clifford T. Hultin
ATTORNEY

Jan. 15, 1957 C. T. HULTIN 2,777,337

POWER TRANSMISSION

Filed Aug. 15, 1952 15 Sheets-Sheet 2

INVENTOR.
Clifford T. Hultin
BY Clifford T. Hultin
ATTORNEY

INVENTOR.
Clifford T. Hultin
BY Clifford T. Hultin
ATTORNEY

Jan. 15, 1957 C. T. HULTIN 2,777,337

POWER TRANSMISSION

Filed Aug. 15, 1952 15 Sheets-Sheet 4

INVENTOR.
Clifford T. Hultin
BY
Clifford T. Hultin
ATTORNEY

Jan. 15, 1957 C. T. HULTIN 2,777,337

POWER TRANSMISSION

Filed Aug. 15, 1952 15 Sheets-Sheet 5

INVENTOR.
Clifford T. Hultin
BY
Clifford T. Hultin
ATTORNEY

INVENTOR.
Clifford T. Hultin
BY Clifford T. Hultin
ATTORNEY

INVENTOR.
Clifford T. Hultin
BY Clifford T. Hultin
ATTORNEY

Jan. 15, 1957 C. T. HULTIN 2,777,337

POWER TRANSMISSION

Filed Aug. 15, 1952 15 Sheets-Sheet 8

INVENTOR.
Clifford T. Hultin
BY
Clifford T. Hultin
ATTORNEY

INVENTOR.
Clifford T. Hultin
BY Clifford T. Hultin
ATTORNEY

Jan. 15, 1957 C. T. HULTIN 2,777,337

POWER TRANSMISSION

Filed Aug. 15, 1952 15 Sheets-Sheet 10

INVENTOR.

Clifford T. Hultin

BY Clifford T. Hultin

ATTORNEY

INVENTOR.
Clifford T. Hultin
BY
Clifford T. Hultin
ATTORNEY

INVENTOR.
Clifford T. Hultin
BY Clifford T. Hultin
ATTORNEY

Jan. 15, 1957 C. T. HULTIN 2,777,337

POWER TRANSMISSION

Filed Aug. 15, 1952 15 Sheets-Sheet 13

INVENTOR.
Clifford T. Hultin
BY
Clifford T. Hultin
ATTORNEY

INVENTOR.
Clifford T. Hultin
BY
Clifford T. Hultin
ATTORNEY

Jan. 15, 1957 C. T. HULTIN 2,777,337

POWER TRANSMISSION

Filed Aug. 15, 1952 15 Sheets-Sheet 15

INVENTOR.
Clifford T. Hultin
BY
Clifford T. Hultin
ATTORNEY

United States Patent Office 2,777,337

Patented Jan. 15, 1957

2,777,337

POWER TRANSMISSION

Clifford T. Hultin, Arlington, Va.

Application August 15, 1952, Serial No. 304,666

79 Claims. (Cl. 74—754)

(Granted under Title 35, U. S. Code (1952), sec. 266)

The invention described herein may be manufactured and used by or for the Government of the United States of America for governmental purposes without the payment to me of any royalty thereon.

This invention relates to a power transmission for conveying torque from a driver to a driven shaft at varying gear ratios. It relates further to a transmission for conveying power from a driver to a driven shaft wherein the gear ratios are varied with all gears remaining constantly in mesh. A still further object of this invention is to provide a power transmitting unit wherein the various gear ratios are made effective by engaging friction brakes and clutches. Again an object of this invention is to provide a power transmission unit having two underdrive gear ratios, one direct drive, one overdrive ratio and one reverse drive ratio. A further object of the invention is to provide a variable ratio power transmission wherein the change in drive ratios is stored up by preselection and wherein the changes from a low to a higher ratio are made stepwise. An additional object of this invention is to provide a variable ratio power transmission wherein the ratio obtainable at any moment is automatically preselected on the basis of the speed of the vehicle. A still further object is to provide a transmission wherein there is positive drive to the wheels of the vehicle, thereby making the engine available for braking purposes.

Further objects of the invention will appear in the following description:

Referring to the drawings.

Figure 5:
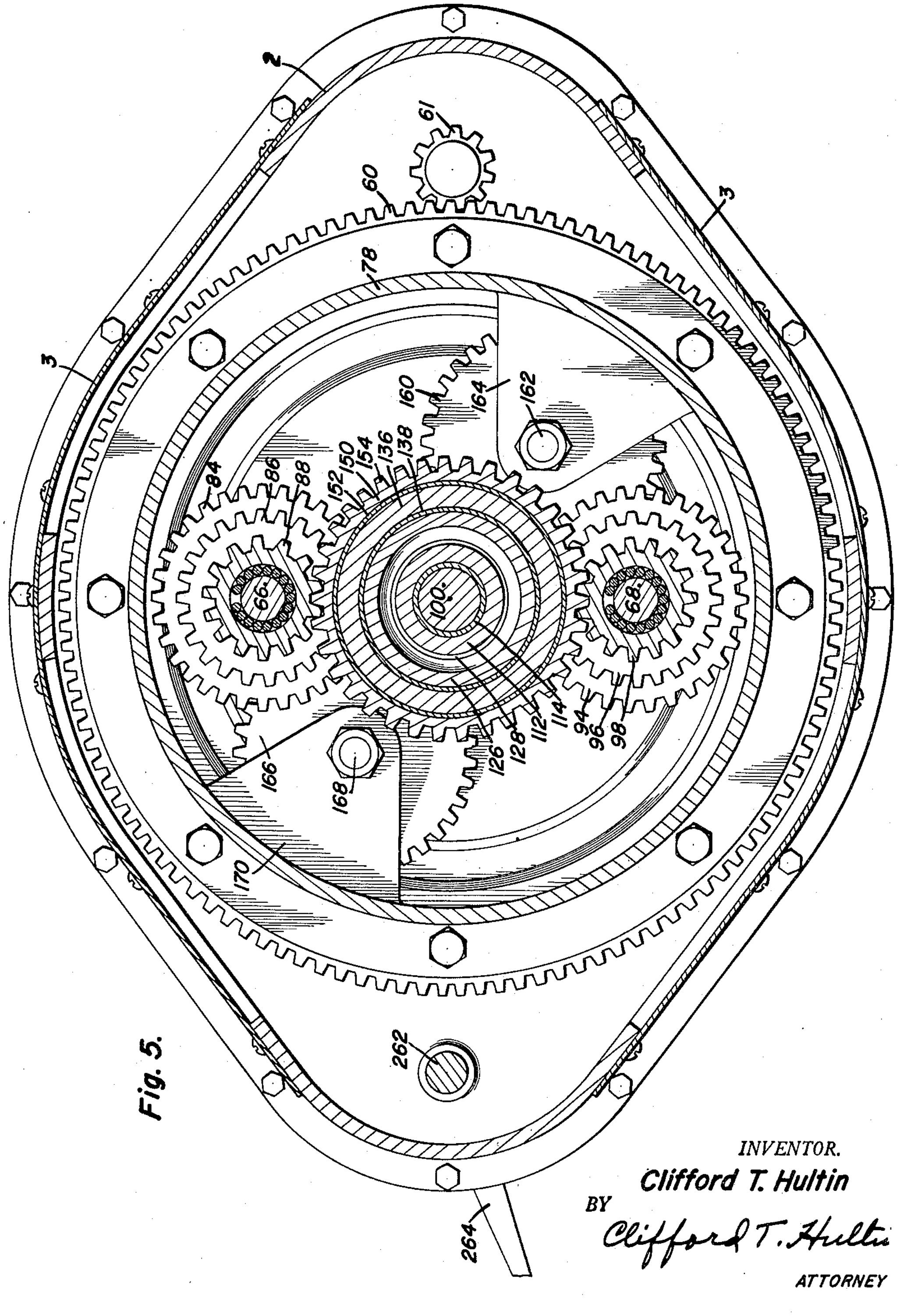
Fig. 5 shows a transverse section along 5, 5 in Fig. 2.
Figure 6:
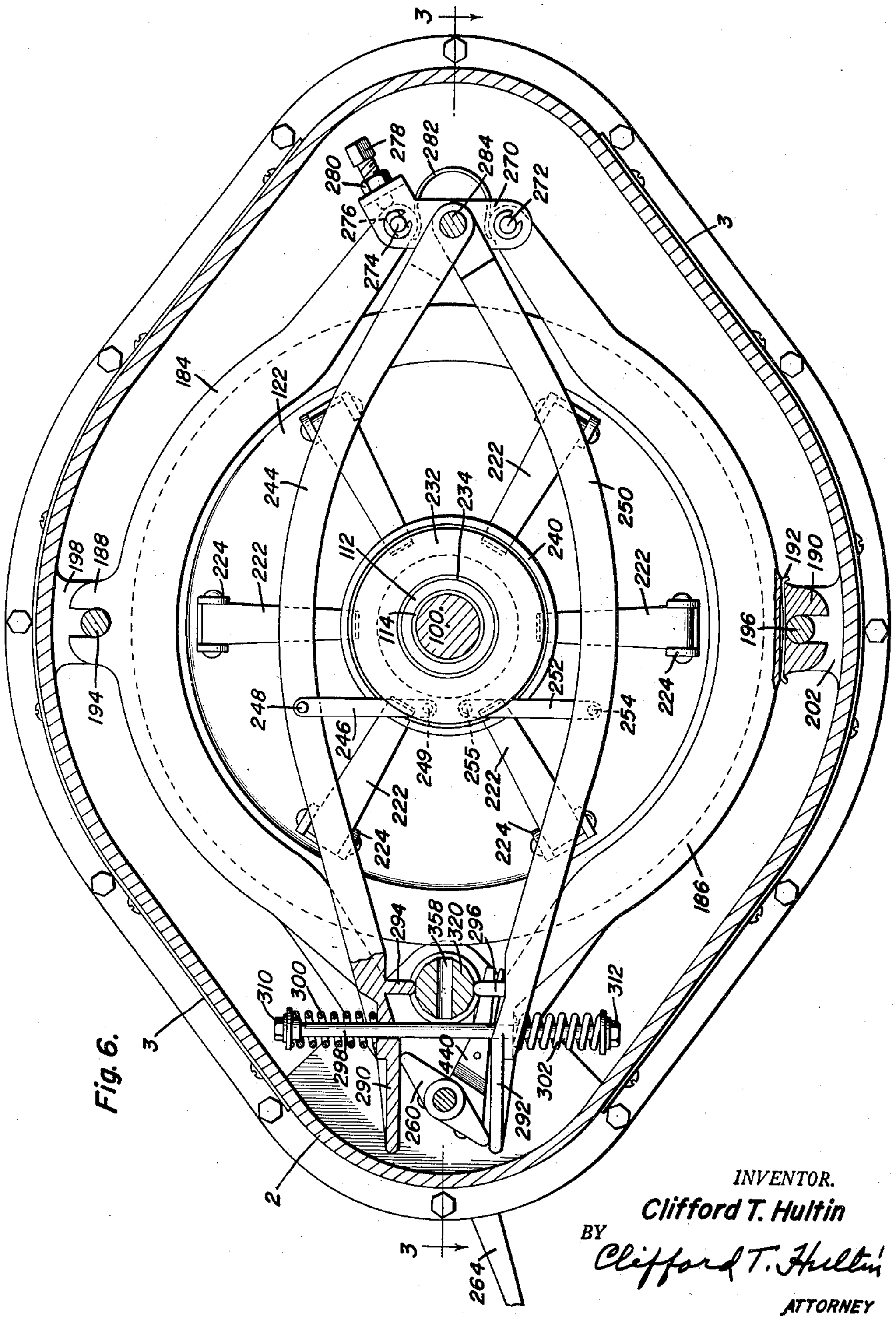
Fig. 6 shows a transverse section along 6, 6 in Fig. 3.
Figure 7:
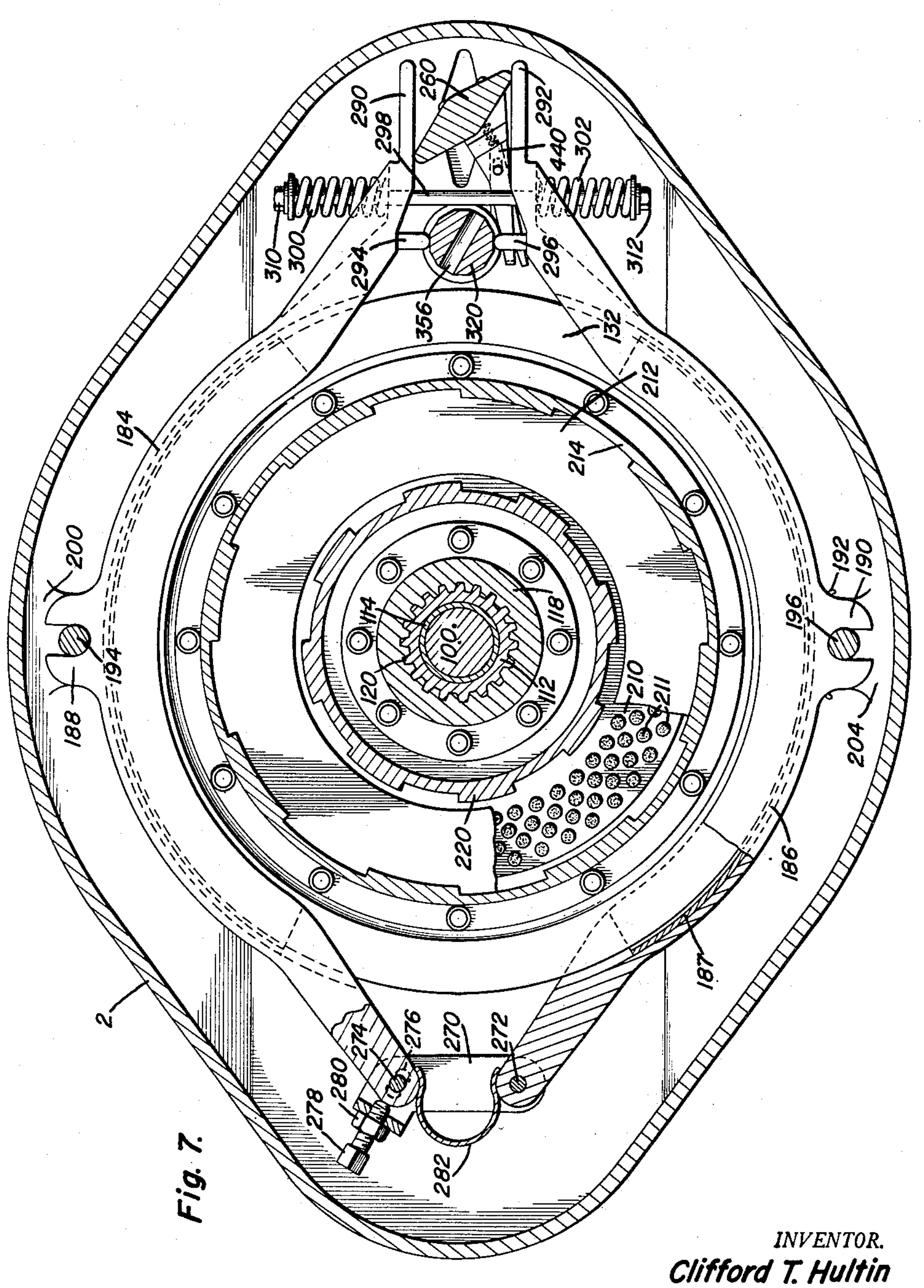
Fig. 7 shows a transverse section along 7, 7, in Fig. 2.

The transmission is of the planetary or epicyclic type and the working parts are therefore symmetrical with respect to the central shaft or axis. The transmission is normally attached directly to the flywheel of the engine and is contained in a casing 2 which has a general elliptical shape as seen in Figs. 5, 6 and 7. The casing is attached to the engine frame in the position occupied by the flywheel housing in the ordinary motor and transmission assembly. The main shaft 100, which forms the axis of the transmission, is supported on ball bearings at each end. Its inner end is journalled in the flywheel in radial ball bearing 108, and its outer end is supported by the radial ball bearing 228 in the end of housing 2. In addition, a large thrust ball 106 is provided at a front end of the main shaft to take the thrust incident to operation, as the helical teeth of the main shaft gear are inclined so as to force the main shaft forward against the ball thrust bearing when the vehicle is in forward motion. Any reverse thrust, which occurs when the rear wheels drive the motor, is taken by the rear ball bearing through overdrive sleeve 112.

The main transmission elements consist of planet cluster gears 62 and 64, main shaft 100 with integral main shaft sun gear 102, sleeves 112, 126, 136 and 150 with the accompanying pinions 116, 130, 140, 154 and brake discs 122, 132, 142 and 156 together with overdrive idler gears 160 and 166. The planet cluster gears 62 and 64 are journalled on shafts 66 and 68 by means of needle roller bearings 70 and 72 respectively. These shafts, in turn, have one end supported in the flywheel 56, in recesses 74 and 76 and the other end supported by planetary gear casing 78. This casing serves the combined purpose of positioning the cluster gear shafts 66 and 68, overdrive idler gear shafts 162 and 168, as well as providing a lubricant container for the gears. The planet cluster gears 62 and 64 consist of integral pinions 80, 82, 84, 86, 88, 90, 92, 94, 96 and 98 respectively. In the respective planet clusters, pinions 80 and 90 engage the main shaft sun gear 102. Pinions 82 and 92 engage the overdrive idler gears 160 and 166. These in turn engage pinion 116 which is a part of overdrive sleeve 112. Pinions 84 and 94 engage pinion 130 of intermediate sleeve 126. Pinions 86 and 96 engage pinion 140 of low sleeve 136, and pinions 88 and 98 engage pinion 154 of the reverse sleeve 150.

The entire assembly of sleeves is concentric with, and rotates upon, the mainshaft 100. The sleeves are machined and ground on the outer surfaces to provide bearing for the brass bushings of the next outer sleeve. The sleeve gears are of such size that 126 slides within 136, and 136 in turn slides within 150. The pinion 116 on sleeve 112 is too large to slide within sleeve 126; hence it must be inserted from the reverse direction, and to make this possible, sleeve 112 is splined at 120 to receive the splined overdrive sleeve hub 118 after the sleeve is inserted within sleeve 126. Overdrive sleeve 112 continues through to ball bearing 228 for thrust purposes. When the entire sleeve assembly is placed in position, it fills the entire opening in planetary gear casing 78 and forms an enclosed gear assembly within the outer casing 2. This inner casing 78 is filled with transmission lubricant to provide lubrication for the gears. The outer casing 2 is filled with a lighter oil for lubricating other parts of the transmission external to casing 78.

The concentric sleeves and pinions terminate in the brake discs 122, 132, 142 and 156, and each of these discs have brake shoes 172, 174, 176, 178, 180, 182, 184 and 186 applied to their surfaces. When any one of these pairs of brake shoes are applied to the respective discs, it will stop the corresponding sleeve and pinion and cause the planet clusters to roll over this particular pinion. This will drive the mainshaft gear 102 in accordance with a gear ratio which is dependent upon the size of the various gears in the train.

To provide the necessary gear ratios, the following size gears have been chosen by way of illustration, the numbers representing teeth in each case.

| | |
|---|---|
| **102**=37 | **88** and **98**=16 |
| **80** and **90**=19 | **116**=18 |
| **82** and **92**=25 | **130**=24 |
| **84** and **94**=32 | **140**=32 |
| **86** and **96**=24 | **154**=40 |

The above gears are on the basis of a diametral pitch of 8, hence the distance betwen centers of the mainshaft 100 and planet cluster shafts 66 and 68 will be $$\frac{37+19}{8\times 2}=3\tfrac{1}{2}\text{ inches}$$

The sizes of all the other gears are calculated to fit this same spacing.

In analyzing the operation of the respective gear ratios, it will be noted that brake disc 156 controls reverse. When this disc and accompanying gear 154 are stopped, the following ratio obtains:

$$\frac{40}{16}\times\frac{19}{37}=1.283$$

That is, for one revolution of the flywheel, mainshaft 100 makes 1.283 revolutions. We therefore subtract 1, since the flywheel has made a +1 revolution. This gives −.283 net revolution of mainshaft 1.

By proportion $$\frac{.283}{1}=\frac{1}{X}\text{ and }X=3.52$$

which means that the flywheel makes +3.52 revolutions for −1.0 revolution of the mainshaft. The ratio in reverse is accordingly 3.52/1.

Disc 142 and accompanying gear 140 control low gear. When this brake disc is stopped, the following gear ratio obtains:

$$\frac{32}{24}\times\frac{19}{37}=.685$$

That is, for one revolution of the flywheel, mainshaft 100 makes −.685 revolution relative to the flywheel. Thus, the final revolution of the mainshaft will be +1.0−.685=+.315 revolution.

By proportion $$\frac{.315}{1}=\frac{1}{X}\text{ and }X=3.17$$

The low ratio is therefore 3.17/1.

Disc 132 and accompanying gear 130 control intermediate gear. When this disc is stopped, the following ratio obtains:

$$\frac{24}{30}\times\frac{19}{37}=-.411$$

That is, for one revolution of the flywheel, mainshaft 100 makes −.411 revolution relative to the flywheel. Thus, the final revolution of the mainshaft will be +1.0−.411=+.589. By proportion $$\frac{.589}{1}=\frac{1}{X}\text{ and }X=1.69$$

The intermediate ratio is therefore 1.69/1.

Disc 122 and accompanying gear 116 control the overdrive gear. When this disc is stopped, the following ratio obtains:

$$\frac{18}{25}\times\frac{19}{37}=+.$$

Due to the extra gears 160 and 166 interposed between gear 116 and cluster gears 82 and 92, this becomes a + addition; hence for every 1.0 revolution of the flywheel, the main shaft makes 1.+0.37=+1.37 revolutions. Assuming a rear axle ratio of 4.11/1, this overdrive will give an overall ratio of $$\frac{4.11}{1.37}\text{ or }3/1$$

which is a customary ratio when overdrives are used.

The direct drive or high gear is accomplished by locking together discs 122 and 132 through the medium of the multiple plate clutch between these discs.

In the description of the invention, the different gear ratios will be referred to merely as low, intermediate, high, overdrive, neutral and reverse. All of the gear ratios shown are in line with values used in actual practice. The diametral pitch of 8 here used, as well as the size of the gears in each case, are purely for illustrative purposes to show one specific embodiment of the transmission. Actually, the gears and elements shown are rather large for transmitting the normal power developed by an automobile engine and the size could be reduced considerably with a resulting economy of space. Or, if the relatively large diameter of the gears is retained, they could be made with shorter faces than shown with a resulting reduction in the length of the transmission. In the embodiment shown, only two planet cluster gears and accompanying overdrive idler gears are shown. This is for purposes of illustration only and it is obvious to one skilled in the art that 3 planet cluster gears can be used equally well and this is rather common practice. The use of more planet clusters makes for greater division of the load and a possible corresponding reduction in the size of the transmission.

The brake shoes are hinged in pairs to envelop the respective brake discs. A typical pair of brake shoes is shown in Fig. 6. The shoe halves are 184 and 186 and represent the upper and lower overdrive shoes respectively. The brake shoe halves are linked through yoke 270 and pins 272 and 274. Instead of a round hole, the upper shoe is fitted with an inclined slot 276 and screw 278 which serves to adjust the relative difference between centers of pins 272 and 274. Locknut 280 holds screw 278 in position and spring 282 serves to keep the shoes biased from each other. Each shoe half is anchored by means of anchor yokes 188 and 190 which are held in position by anchor pins 194 and 196. Each of these pins run the full length of the four brake shoes and are held in position at the inner end by supports 198 and 202 and at the outer end by supports 200 and 204. Spring 192, in the lower shoes, serves to support the weight of the shoes when they are disengaged. Each brake shoe half has a lining of brass or other suitable metal to serve as a braking surface on the steel brake discs.

The ends of the brake shoes, which are opposite the hinge, terminate in extended cam follower surfaces 290 and 292 which serve as a surface for the clutch cam 260. Adjacent and inside the cam follower surfaces 290 and 292 the shoes are perforated to receive brake arm compression bolt 298. Compression springs 300 and 302 on this bolt are held in place by end nuts 310 and 312 and serve to compress the brake shoes about the brake discs. Adjacent and inside of these compression bolts on the brake shoes are brake arm lugs 294 and 296. These lugs are of such size and shape as to fall into rectangular opening 358 in selector cylinder 320 when the latter cylinder is turned so that the respective opening therein is vertical and in line with the lugs. When this situation obtains, the lugs will fall into the opening in the selector cylinder and the brake shoes will be compressed about the brake disc thereby stopping the disc and setting a certain gear train in operation.

Selector cylinder 320 extends the length of all the brake shoes and is supported between the open ends of the brake shoes in line with lugs 294 and 296. The inner end of the cylinder is carried in support 324, which also supports the end of the clutch cam 260. The outer end of the selector cylinder is supported in the casing wall at 342 and continues out through the wall into the preselector control mechanism in casing 338. The selector cylinder has five positions along its length, each position occupying a distance represented by the width of the respective brake shoe cam follower and lugs. Each of these positions is in the form of a dodecagon in which two opposed faces are cut through to form an opening for lugs 294 and 296. This series of openings is indicated at 350, 352, 354, 356 and 358 and are positioned respectively under the reverse, low, intermediate, overdrive and high shoes. The openings are arranged so that only one pair of lugs can enter the openings in the selector cylinder at any one time. In this manner it is impossible to engage more than one of the gear trains at any one time and the particular ratio to be engaged is determined by the position of the selector cylinder. The reverse, low, intermediate, and overdrive are engaged by means of brake shoes, whereas the high or direct drive is engaged by the compressing movement of arms 244 and 250. These arms are hinged at pin 284 and terminate in cam follower surfaces like those of the brake shoes. They will be referred to as brake shoes for purposes of this description. The movement of these arms is affected by means of compression springs in the same manner as that of the brake shoes and this movement actuates the multiple plate clutch between the intermediate and overdrive discs 132 and 122.

The operation of the clutch is effected through an expansion dog clutch 232, 236; a thrust clutch bearing 240 and pivoted clutch engagement levers 222. More specifically, levers 244 and 250 have links 246 and 252 attached respectively at pins 248 and 254. These links are attached to the two halves of the expansion dog clutch by means of pins 249 and 255.

The expansion dog clutch is composed of the primary sleeve 232 which serves as a spacer between bearing 228 and overdrive sleeve hub 118. This primary sleeve is equipped with angular cam surfaces 233 which mate with corresponding angular cam surfaces 237 on the secondary movable sleeve 236. The latter sleeve rotates upon the primary sleeve 232. Both the primary and secondary sleeves are equipped with flanges to which the actuating links 246 and 252 are attached. The secondary sleeve also carries a shoulder 238 which supports the thrust bearing 240. When arms 244 and 250 are compressed together, links 246 and 252 rotate the primary and secondary sleeves with respect to each other and thereby expand the clutch. This forces the clutch engagement levers into contact with the outer clutch plates 212. The alternate plates are splined within outer flange 214 and rotate with the overdrive brake disc 122. Alternate plates 210, which may have cork inserts, are splined within the inner flange 220 and rotate with the intermediate brake disc 132. When the alternate plates are forced together by means of levers 244 and 250, the clutch engages, making the whole gear assembly rotate as a unit and the transmission is accordingly in direct or high. The levers which engage direct drive as well as the several brake bands are all actuated in similar fashion and the selective engagement of any one of them is brought about by the position of the selector cylinder 320.

The transmission shown, utilizes a particular form of planetary gearing wherein a plurality of planet clusters are used and wherein all gears meshing therewith are central to the clusters. It is emphasized that any type of planetary gearing may be used, the only requirement being that the actuating mechanism shall consist of brake shoes and multiple plate clutches for clutching together elements to provide a unitary operating unit. Thus, the principles of this invention are equally applicable to a series of planetary units composed of sun, planet and ring gears.

Figures 18, 19, 20:
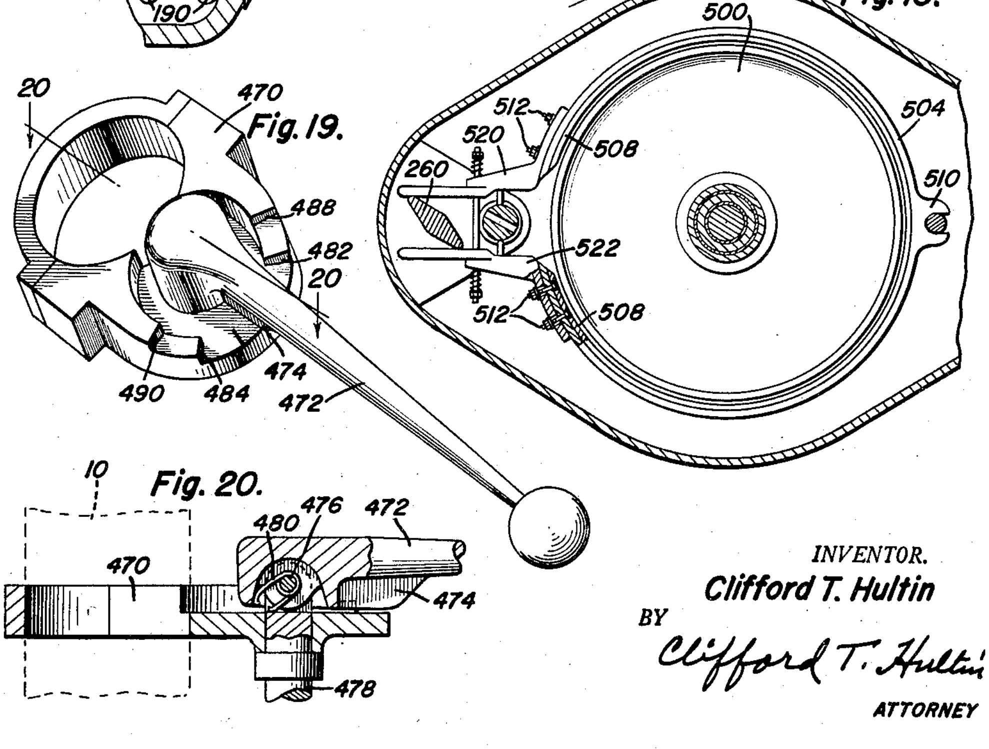
Fig. 18 shows an alternative form of brake band for the brake mechanism.
Fig. 19 shows the steering post selector lever.
Fig. 20 is a section through the control handle at 20, 20 in Fig. 19.

In addition to the hinged brake shoes previously described, this invention also comprehends the use of the more conventional brake band and drum shown in Fig. 18. This modification consists of a flat brake band 504 operating on a flat face drum 500. Lining 508 serves as a friction surface and the band is contracted about the brake drum by means of lugs 520 and 522 which are attached to the end of the band by means of adjustable attachment bolts 512. The lugs 520 and 522 are shaped as the end of the hinged brake shoes of the basic modification already described and are operated upon by the brake cam and selector cylinder in the same manner. Anchor 510 serves to hold the band in position.

In order that any clutch band may be released from the brake disc, a clutch cam 260 is provided. This clutch cam is journalled in the end plate 330 at 336 and also in the inner support 324. Shaft 262 is an extension shaft of the clutch cam and passes out of the front end of the transmission housing and terminates in lever arm 264. Link 20 connects the lever arm to clutch pedal 14, and link 22 connects the same arm to the vacuum cylinder 26 through the lever 30 pivoted at 32. Spring 24 holds the clutch cam in a neutral position. Links 20 and 22 slidably move in lever 264, hence the clutch pedal and the vacuum cylinder may operate the clutch cam independently of each other.

When the clutch cam 260 is operated, it contacts the brake shoes as shown in Figs. 4, 6, 7, 15 and 16. The movement of the cam first lifts any one shoe that may be in engagement with a brake disc. When this one shoe has been lifted to the level of the unengaged shoes, a further movement of the clutch cam will lift all five shoes out of contact with the selector cylinder 320 thereby permitting this cylinder to be rotated. The movement of this cylinder 320, together with the coordinated movement of the clutch cam 260, gives the transmission its operating characteristics.

Figure 15:
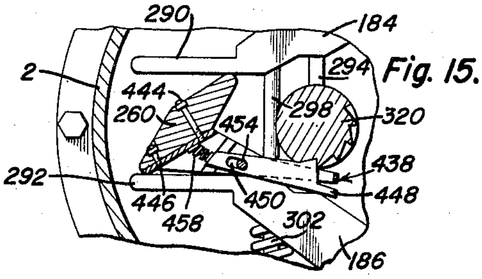
Figs. 15 and 16 are detailed views of two positions of the clutch cam, selector cylinder and preselector pawl which is visible in Figs. 3, 4, 6 and 7.
Figure 16:
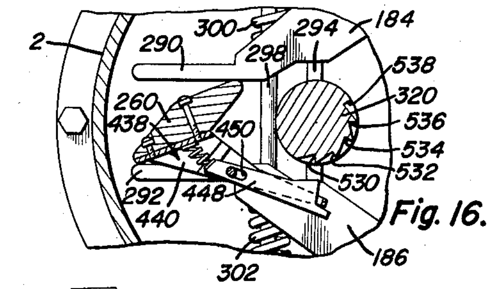
Figure 17:
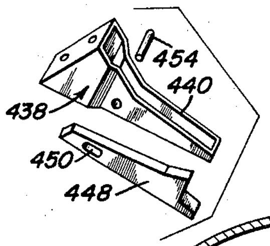
Fig. 17 is an exploded view of the stepwise preselector pawl of Figs. 15 and 16.

In Figs. 8 to 13, together with Figs. 15, 16 and 17, a preselector mechanism is shown which provides for a semi-automatic functioning of the transmission. To distinguish it from other mechanisms to be subsequently described, it will be designated as modification A. This mechanism consists of three discs 360, 374, and 390. Of these, disc 390 is fixedly attached to the selector cylinder shaft extension. This extension is partially threaded and fitted with a threaded spacer 375. The threaded portion of the shaft is grooved to receive the locating lug 404 on disc 390. This lug and groove serves to orientate the disc with respect to the shaft and also to prevent the disc from turning with respect to the shaft.

Figures 8, 9, 10, 11:
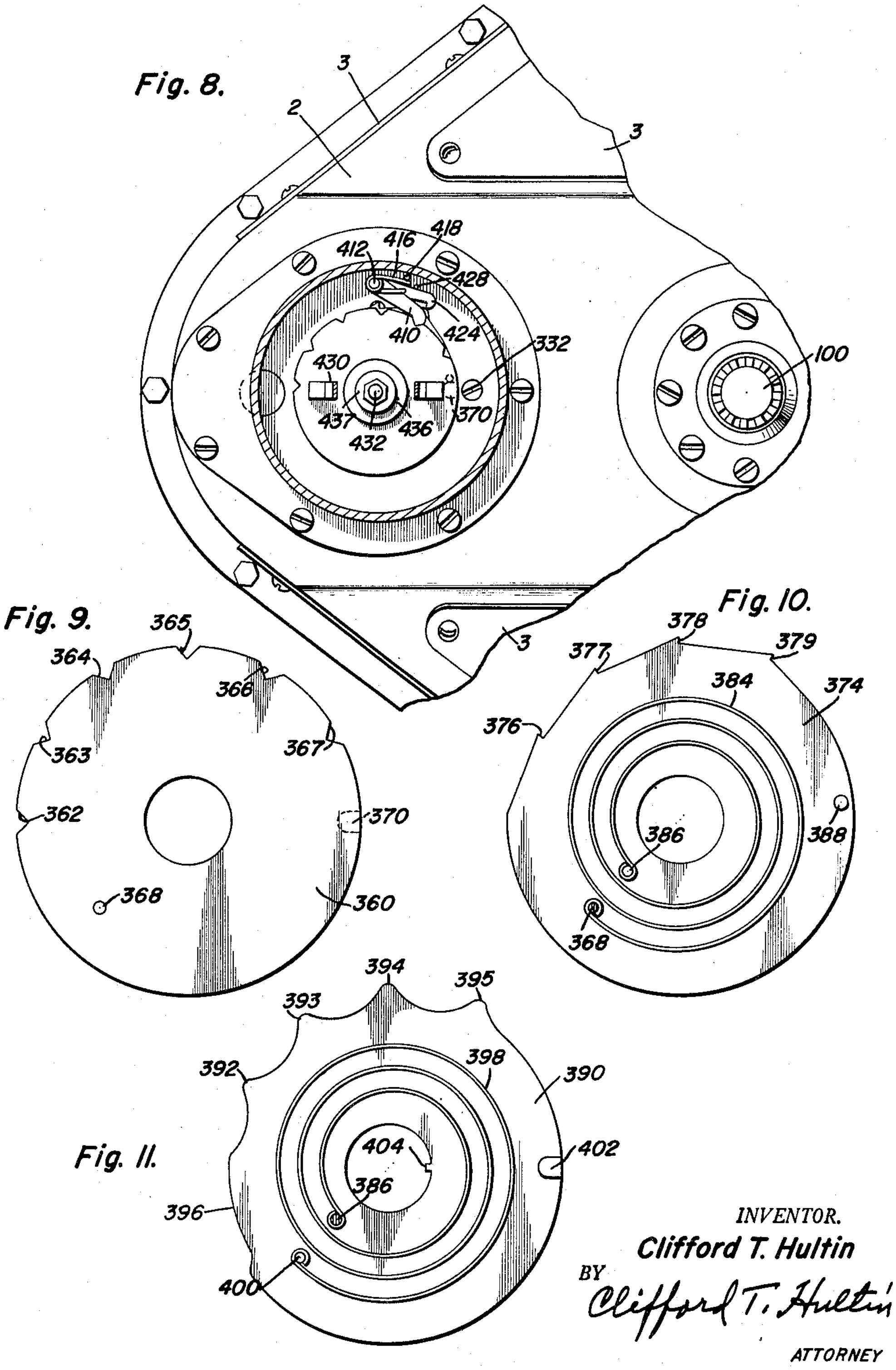
Fig. 8 shows a transverse section of the preselective mechanism along 8, 8 in Fig. 3.
Figs. 9, 10 and 11 are respectively the outer, middle and inner discs of the preselective mechanism shown in Figs. 3 and 8.
Figure 14:
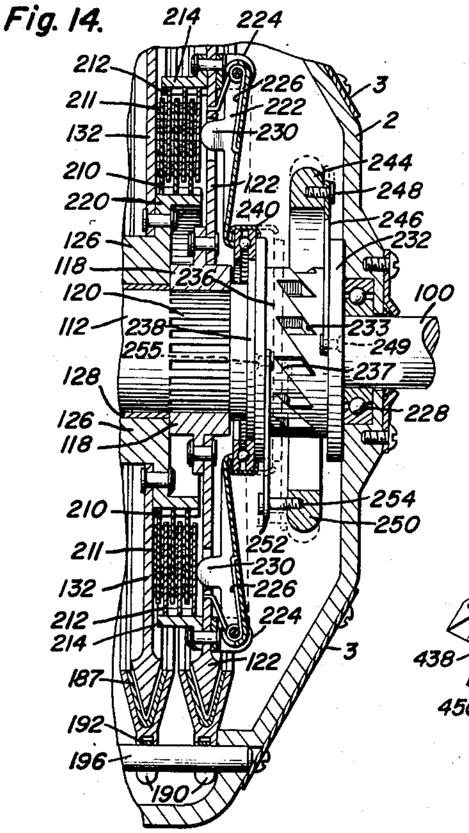
Fig. 14 is a detailed view of the multiple plate clutch and clutch actuating mechanism which is visible in Figs. 2, 3, 4, 6 and 7.

Discs 374 and 360 are located on the smooth portion of the selector cylinder shaft extension. A smooth spacing washer 361 of the same thickness as threaded spacer 375 is placed between the latter two discs. A nut and washer 437 on the end of the shaft together with spacing washer 436 holds the assembly in position. The outer disc 360 is equipped with a yoke 430 and a shaft 432. This shaft extends through housing 338 and is attached to the selector lever on the steering column through the intermediary of the flexible cable 8 and shaft 478. The inner disc 390 is equipped with four cam lobes 392, 393, 394 and 395, spaced 30° apart and being spaced increasing distances from the center of the disc. In the modification shown in Fig. 11, cam lobe 393 is at a distance from the center of the disc corresponding to the normal disc radius. Cam 392 is within this radius and cams 394 and 395 are progressively outside this radius. Disc 374 is equipped with a series of four notches 376, 377, 378 and 379. These notches are spaced apart 30° and have the same elevational differences as in the case of the cams of disc 390. Outer disc 360 has a series of six V notches 362, 363, 364, 365, 366 and 367. These notches are also spaced 30° apart and together with pawl 410 serve to locate the six positions of the selector lever. The inner and outer discs 360 and 390 have lugs 370 and 402 respectively, which are bent inwards to contact pin 388 in the center disc 374. Two spiral springs 384 and 398 are positioned between the discs. These springs are coiled as shown in Figs. 10 and 11. The inner end of each spring is attached to pin 386 which extends on both sides of disc 374. The outer end of each spring is attached respectively to pin 368 in disc 360, and to pin 400 in disc 390. These springs serve to bias disc 374 so that pin 388 will rest against lugs 370 and 402. This is accomplished by partially prewinding and prestressing the springs so that the pin and lugs are in pressure contact. The springs are of such size and length that the force required to wind up the springs another 120° is reasonably constant.

Beyond the circumference of the discs is a pin 412 on which is pivoted two pawls 410 and 424. Both of these pawls have biasing springs 416 and 428 which serve to keep them in contact with the circumference of the discs. Pawl 410 is shaped to fit the V notches in disc 360 and serves the purpose of locating the six positions represented by these notches. Pawl 424 is in the form of a hook which engages the notches on disc 374 and it carries a side extension 426, the edge of which is even with the lower portion of the hook. The length of extension 426 is sufficient to engage the cams on disc 390 when pawl 424 is positioned over disc 374. When pawl 424 falls into any notch on disc 374, the corresponding cam on disc 390 will serve to lift the pawl out of engagement with the notch in disc 374.

For purposes of illustrating the functioning of this preselector device, we shall assume that selector cylinder 320 is positioned so that opening 356 therein is vertical, thereby permitting brake shoes 184 and 186 to engage overdrive brake disc 122. In this condition, disc 360 is turned clockwise until pawl 410 rests in notch 362. Disc 374 will be in a position such that pin 388 rests on lug 370 of disc 360, and on lug 402 of disc 390. If shaft 432 is now turned counterclockwise until pawl 410 falls into notch 366, then lug 370 will move disc 374 counterclockwise the same distance, namely 120°. Disc 390 will not be able to turn counterclockwise since it is fixed to the selector cylinder shaft and the latter is held in position by the lugs in opening 356. This difference in angular displacement between disc 374 and 390 is absorbed by coiling spring 398. As disc 374 was moved counterclockwise, pawl 424 passed notches 376, 377 and 378 and is ultimately caught in notch 379. Suppose further, that shaft 432 is turned clockwise again to its original position. In this movement, disc 374 will retain fixed due to the position of pawl 424 in notch 379, and the angular displacement between discs 374 and 360 will now be absorbed by coiling spring 384. Thus at the termination of the movement of shaft 432, disc 374 has been displaced 120° counterclockwise and both coil springs are under tension. Nothing has happened to the selector cylinder 320, however, since it is prevented from turning by the pressure of the brake shoe lugs thereon. If clutch cam 260 is now operated, the selector cylinder will suddenly be freed from restraint by the brake shoes and will be free to rotate. Since spring 398 is under 120° of tension, the selector cylinder 320 will be instantly rotated counterclockwise 120°. When this happens, cam 395 will strike extension 426 of pawl 424, thereby lifting this pawl out of engagement with notch 379 in disc 374. This lifting action can be produced only by cam 395 since the preceding cams are too low. Accordingly, the spring must unwind to the full extent of the angular displacement before disc 374 can be released. The moment the latter disc is released from pawl 424, it will immediately rotate clockwise to the full extent of displacement in spring 384, namely 120°. Thus, the movement of the selector cylinder 320 follows exactly the earlier movement of shaft 432 and disc 360, since these earlier movements were stored or preselected to be released at a later time.

Figure 3:
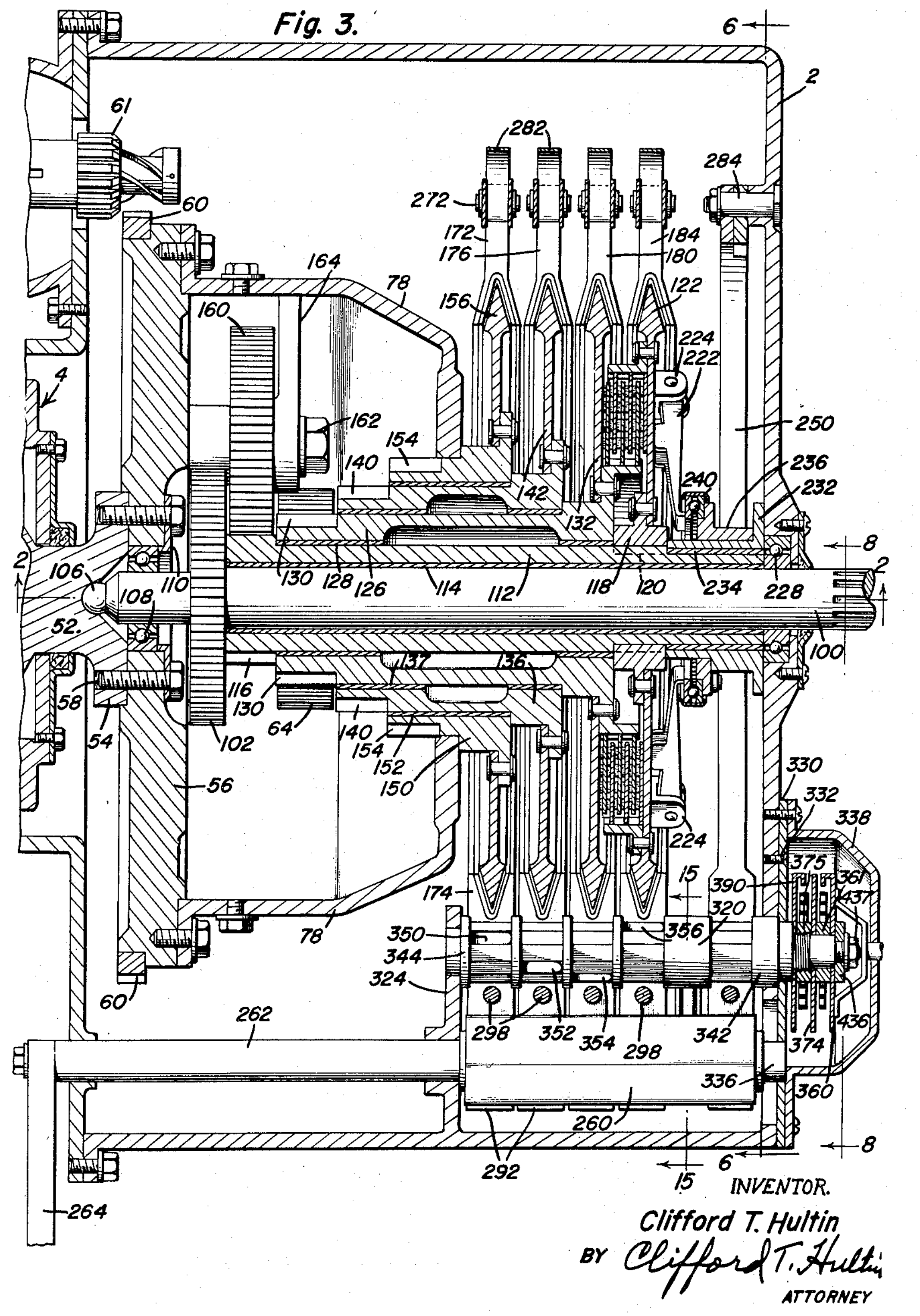
Fig. 3 shows a horizontal section through the transmission.
Figure 4:
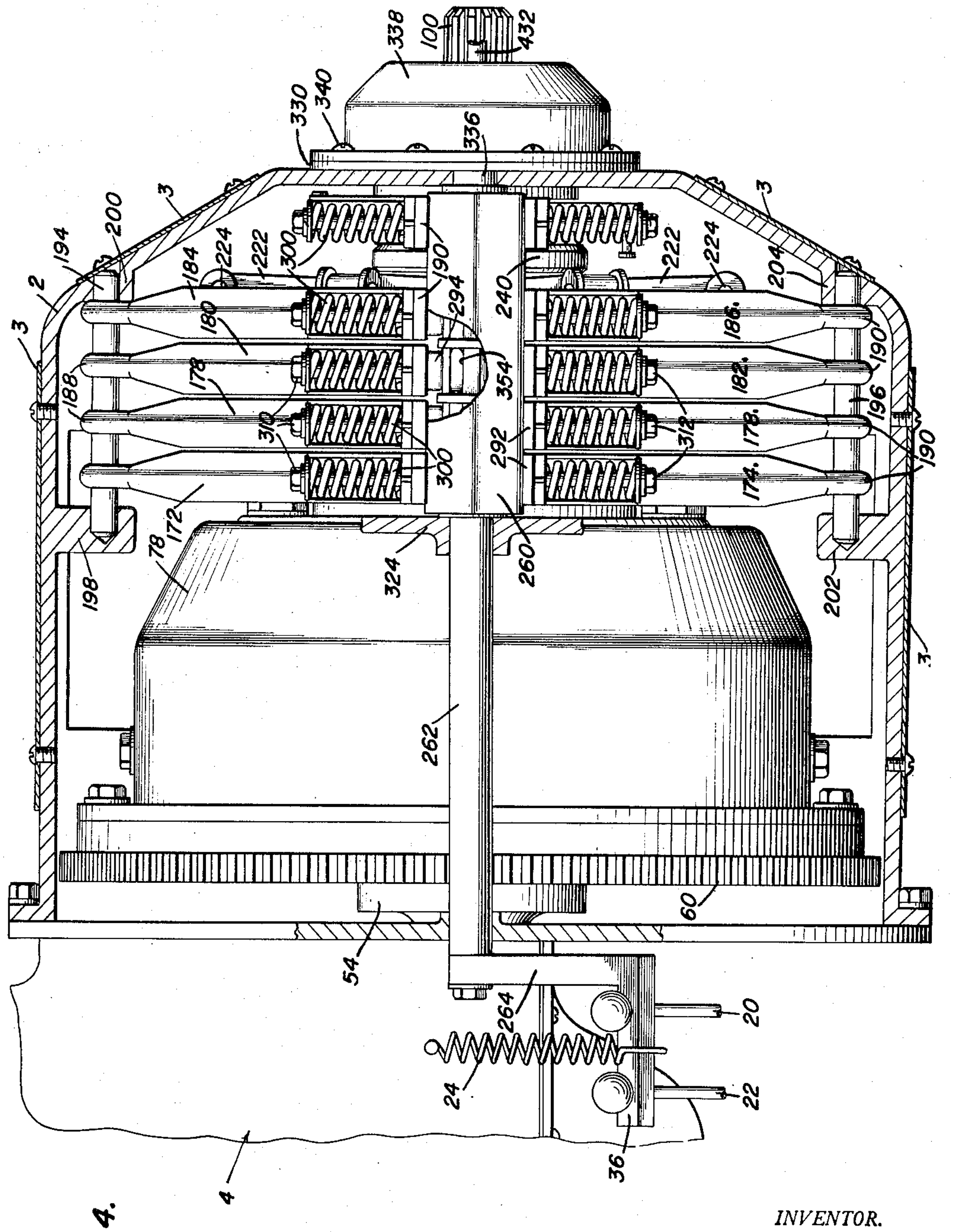
Fig. 4 shows a vertical section through the outer casing.

Since it is desirable that the last or clockwise movement of the selector cylinder shall be stepwise, there is provided a preselector pawl 438 (Figs. 15, 16 and 17) which makes the return movement of the selector cylinder 320 follow a stepwise pattern. This preselector pawl consists of a frame 440 which is attached to the clutch cam 260 by means of screws 444 and 446. Movable member 448 is pivoted on pin 454 inside of the preselector pawl frame 440. The opening in the movable member is in the form of a slot 450 which permits the member to have a moderate amount of longitudinal movement within the frame. Spring 458 biases the movable member 448 outward and upward as shown in Figs. 15 and 16. The preselector pawl is attached to the selector cylinder 320 in the space between the overdrive and the high positions. In this portion of the selector cylinder are arranged five notches, 530, 532, 534, 536 and 538. These notches correspond to the neutral, low, intermediate, high and overdrive positions. Thus, when the preselector pawl is in notch 530, the selector cylinder 320 is in the position shown in Fig. 3.

In this position there are no vertical openings in the selector cylinder, hence all brake shoes will be held in the unengaged position and the transmission is accordingly in neutral. When the preselector pawl is in notch 532, opening 352 will be in the vertical position and the low brake band will take effect. Positions 534, 536 and 538 correspondingly determine intermediate, high, and overdrive positions.

Due to the slot and spring biasing of the movable member, it will assume the position shown in Fig. 16 when it is out of contact with the selector cylinder. As it is brought into contact with the cylinder 320, the movable member will engage notch 532. The latter notch is engaged rather than notch 530, because the movable member is in an extended position and cannot therefore enter notch 530. As the clutch cam 260 moves the pawl into contact with the selector cylinder, the movable pawl member will move outward in yoke 440 against the bias of spring 458. This permits considerable leeway of movement. Upon turning the clutch cam 260, the selector cylinder will be released from restraint by the brake shoes and it will move clockwise, pushing the movable pawl back against spring 458 until the play in the slot is completely taken up (Fig. 15). As the clutch is reengaged, lugs 294 and 296 on one of the brake shoes will enter the vertical slot in the selector cylinder 320 and the lugs of the other brake shoes will make pressure contact with the surface of the selector cylinder, thus holding it fixed. This holding of the selector cylinder precedes the disengagement of the movable pawl member 448 from notch 332 in the selector cylinder. As the latter disengagement takes place, the movable pawl member again springs forward to a position shown in Fig. 16 and on the next cycle it would enter the subsequent notch 534 in the selector cylinder. This flexible construction of the shifting pawl permits only stepwise movement of the selector cylinder 320 in up-changing gear ratios.

Figure 13:
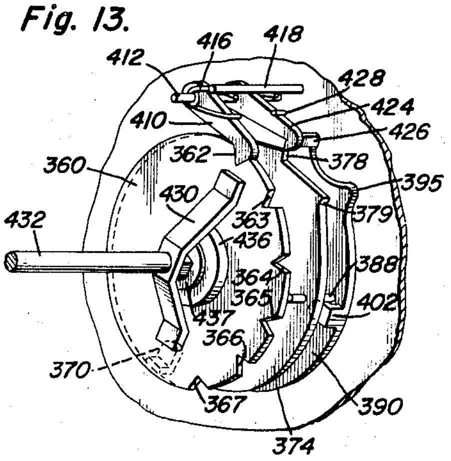
Figs. 12 and 13 show the assembly of the discs of Figs. 9, 10 and 11 on the selector cylinder extension.
Figure 12:
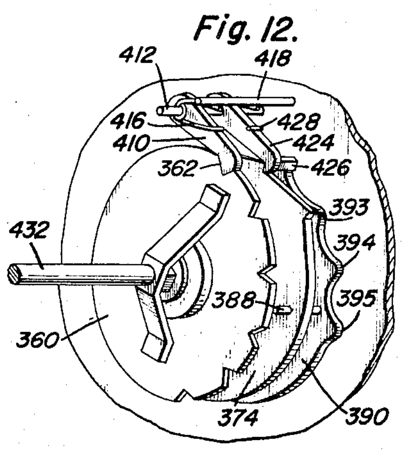
Figure 2:
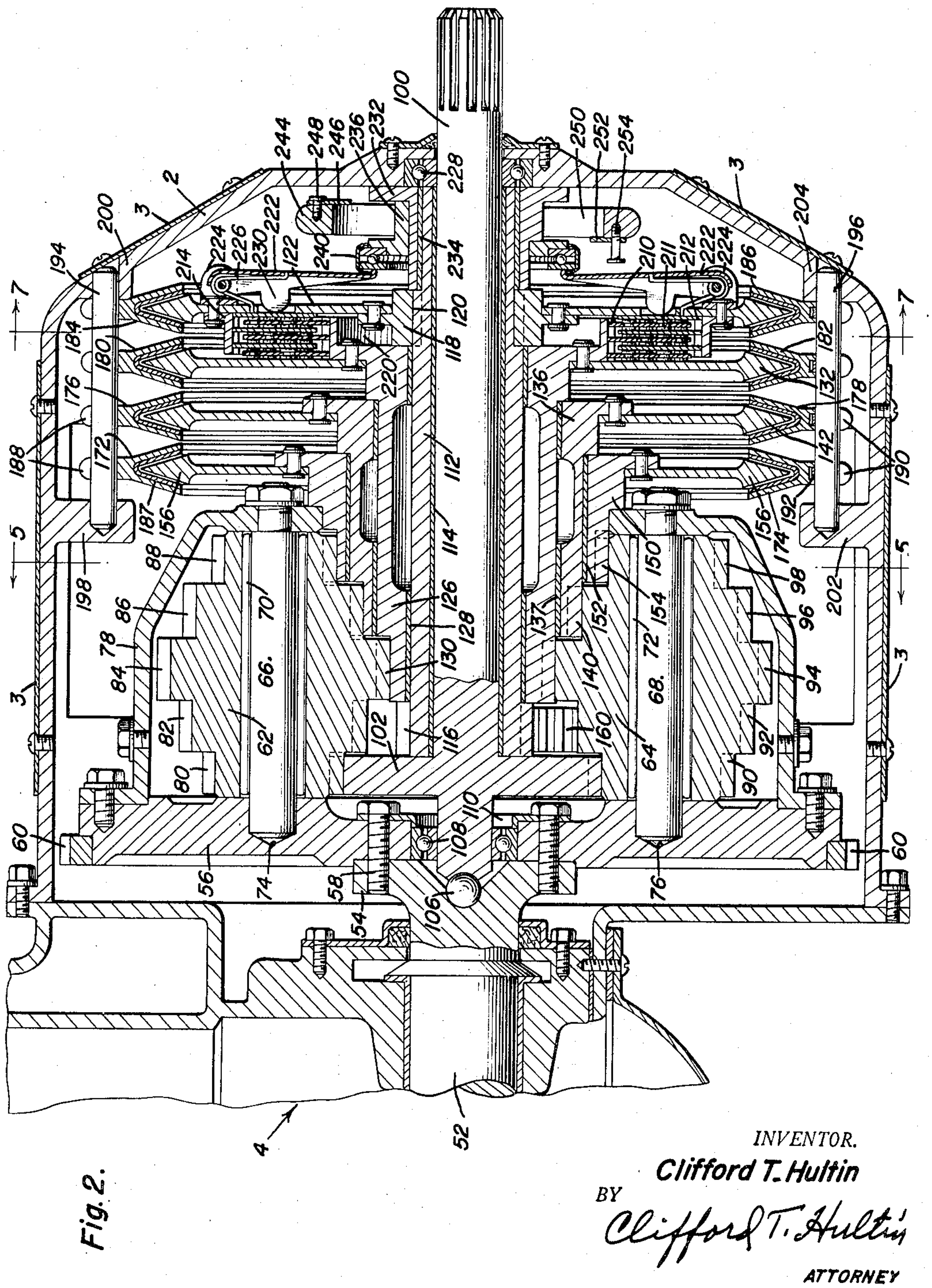
Fig. 2 shows a vertical section through the transmission.

Figs. 12 and 13 show two specific positions of the preselector mechanism. In Fig. 12, pawl 410 is in the overdrive "notch" 362. Pawl 424 is in the low notch 378 and disc 390; therefore, the selector cylinder is in the low position. This condition of the mechanism would be brought about where the transmission had been operating in some forward gear ratio above low, and if, then, shaft 432 and disc 360 had been moved counterclockwise to notch 365 and then clockwise to notch 362, the mechanism would then appear as shown in Fig. 12. As the selector cylinder 320 was then relieved by operating the clutch cam 260, disc 390 would swing counterclockwise until cam 394 struck extension 426 of pawl 424. This lifted pawl 424 out of engagement with notch 378 of disc 374 and the condition shown in Fig. 13 was brought about.

Shaft 432 which controls the preselector mechanism extends out of the casing 338 where it is attached to a flexible control cable 8 which, in turn, joins selector lever shaft 478 and selector lever 472 on the steering column. As shown in Fig. 19, this lever moves through an arc of 150° and has a stop 488 and 490 at each end of its arc of travel. At a point 30° before each end of its travel there are other stops 482 and 484. The entire travel arc includes the six positions on disc 360 and represents the reverse, neutral, low, intermediate, high and overdrive positions respectively. The stops 482 and 484 determine the neutral and high positions. Thus, the selector lever can move freely through neutral to high, but when it is desired to go into reverse or overdrive it becomes necessary to lift the lever to clear stops 482 and 484 respectively. In this manner, it becomes possible to accomplish most of the gear changing without the necessity of observing the gear changing mechanism.

After this analysis of the preselector mechanism it becomes possible to determine the characteristics of a vehicle equipped with the transmission. On entering the vehicle and before starting the engine, it is necessary to ascertain that the transmission is in neutral. This is done by placing the selector lever in neutral and depressing the clutch pedal 14. Due to the preselective character of the transmission, the mere position of the selector lever does not disclose the gear ratio of the transmission. The depressing of the clutch pedal 14, however, brings about the gear change into neutral when the selector lever is so positioned. The feel of the clutch pedal 14 also discloses the condition of the tranmission, for if it is in neutral, the clutch pedal 14 will offer scarcely any resistance to being depressed, due to the fact that all the brake shoe lugs are riding on top of the selector cylinder as shown in Fig. 6. There is, accordingly, only the bias spring 24 to hold the clutch pedal in position and there is nothing for clutch cam 260 to lift until it reaches the angular position shown in Fig. 6. At this point it must lift all five brake shoes and the resistance to further movement increases accordingly. Since clutch cam 260 has a high angular displacement at the time it contacts all the brake shoes, however, the mechanical advantage is quite great and the component of force in the direction of the lifting of the brake shoes is very high. If the transmission is not in neutral, the clutch pedal will offer a somewhat greater resistance due to the necessity of lifting one pair of brake shoe lugs out of the depression in the selector cylinder.

After the engine is started, the selector cylinder can be turned into any desired position or gear ratio and the operation of the clutch pedal 14 then brings about a gear change into this or some lower gear ratio. Thus, if it is desired to go into reverse, the selector lever is moved into reverse and the clutch pedal 14 is depressed. Upon release, the transmission will be in reverse. When it is desired to proceed forward, the selector lever is moved into some forward gear ratio, normally high or overdrive. When this is done, spring 384 will be coiled up and will absorb the angular displacement. It will also tend to bias the mechanism and the selector cylinder clockwise toward the high or overdrive position, as the case may be. When the clutch pedal 14 is depressed, the selector cylinder is released and immediately moves clockwise under the bias of spring 384. Due to the angular position of clutch cam 260, pawl 438 will be in a position to engage notch 530 in the selector cylinder when the cylinder is released, making it impossible for the latter to move clockwise more than one step. In order that the selector cylinder may move forward an additional step, it becomes necessary to first release the clutch pedal 14 thereby engaging low gear. When the clutch is again disengaged, it moves into intermediate gear and this same procedure is repeated in each gear ratio until the ratio corresponding to the selector lever setting is reached. Accordingly, when moving upward in the gear ratios, the selector lever is moved to the highest setting desired and the gears are changed stepwise by merely actuating the clutch pedal 14 until the gear ratio of the selector lever setting is reached. When it is desired to change to a lower gear ratio, the selector lever is moved down, and upon operating the clutch pedal 14, the gear change takes place in one step.

An additional operating feature of the transmission lies in the ability of the preselector mechanism to store up a gear ratio downchange plus a series of upchanges. This is accomplished by moving the selector lever down to a lower ratio, and immediately moving it up again to a higher ratio. Usually such a change will be from high or overdrive down to neutral and up again to high or overdrive. In actual driving practice, this procedure is useful when approaching a stop light or stop sign. In such case, the moment it becomes obvious that a vehicle stop is to be made, the selector lever is moved along the sector until it hits stop 482 and immediately it is moved back until it hits stop 484, or if desired, the lever can be lifted and moved to stop 490. Due to the presence of these stops on the sector, it is unnecessary to take one's eyes off the road during this entire movement. The movement of the selector lever has now stored up a series of gear changes which can be best understood by referring to the changes which have been brought about in the preselector mechanism. In the downchange, when disc 360 is moved counterclockwise, disc 374 is moved counterclockwise also due to the action of lug 370 striking pin 388 thereby rotating disc 374 until pawl 424 engages neutral notch 379 on disc 374. In the meantime, spring 398 has been coiled up due to the fact that disc 390 has remained stationary while disc 374 moved counterclockwise. During the second or clockwise movement of the selector lever and of disc 360, disc 374 is prevented from moving by being held in position by pawl 424. This results in coiling up spring 384. Thus, at the completion of the down and upchange, the preselector mechanism has both springs coiled and disc 374 is held in position 379 by pawl 424.

When it is desired to stop the vehicle, the clutch pedal is depressed. This action releases the selector cylinder which together with disc 390 moves counterclockwise under the bias of spring 398. When lug 402 of disc 390 strikes pin 388 of disc 374, cam 395 of disc 390 will coincide with notch 379 in disc 374 and lift pawl 424 out of this notch. The moment this happens, disc 374 is free to move clockwise under the bias of spring 384. Disc 390 must move with disc 374, however, due to the fact that pin 388 of disc 374 is in contact with lug 402 of disc 390 (Fig. 13). The preselector mechanism is now free to turn clockwise, but the selector cylinder is restrained by preselector pawl 438 which stops the cylinder in the neutral notch 530 (Fig. 15) and further movement in upchanging must be stepwise. Accordingly, with this transmission, the process of stopping a vehicle and then continuing forward is accomplished by moving the selector lever down to a lower ratio and up again to a higher ratio as already described. The change to neutral is accomplished by the first movement of the clutch pedal and further movements of the clutch pedal produce stepwise upchanging.

Figure 1:
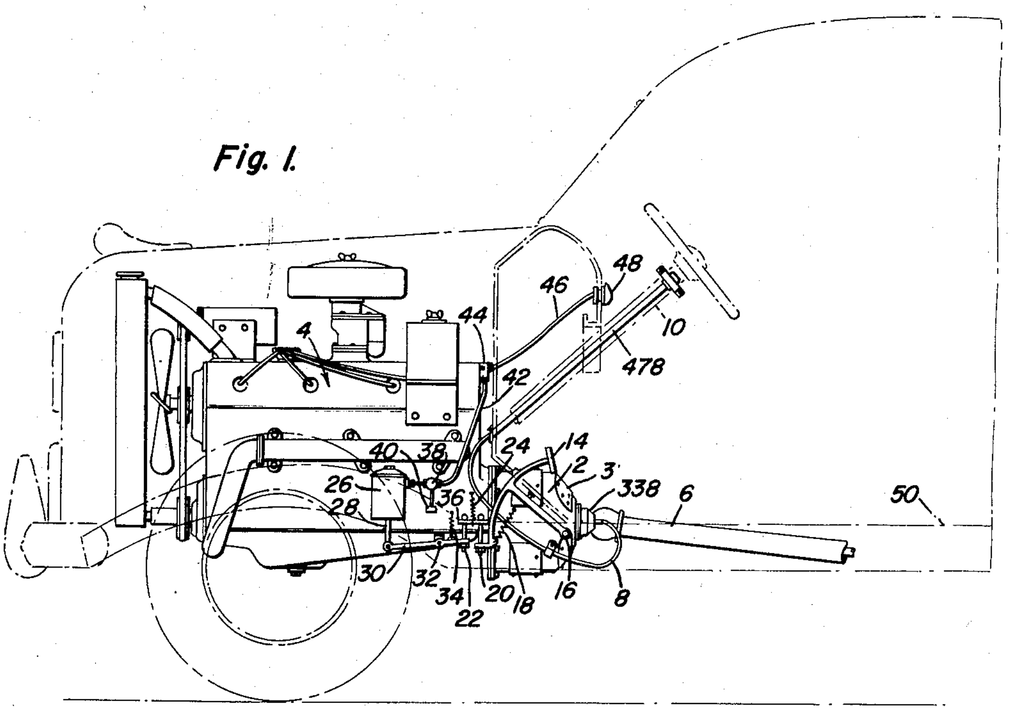
Fig. 1 shows the transmission in position in an automobile.

The previous description is based on a manual operation of the clutch, but automatic clutch operation is equally applicable to this method of changing gear ratios and Fig. 1 shows the elements of an automatic vacuum operated clutch. Here we have an additional clutch link 22 which is attached to piston 28 in vacuum cylinder 26 by means of the pivoted clutch control lever 30. The cylinder is connected to the carburetor intake manifold by means of vacuum line 42. A valve 44 in this line may be closed by dash control 48 acting through control cable 46, thereby rendering vacuum control inoperative. A valve 38, together with an actuating inertia pendulum 40, is also placed in the vacuum line. This vacuum mechanism operates by admitting the vacuum from the intake manifold into cylinder 26, the movement of which then disengages the clutch. Since the vacuum in the intake manifold varies inversely with the throttle opening, it means that the vacuum is highest when the throttle is closed. This means further that the clutch disengages when the throttle is closed and engages as the throttle is opened. By this means, effective automatic clutch operation is secured.

The purpose of the inertia pendulum and valve mechanism is to prevent instability and too rapid engagement of the clutch. If the clutch is suddenly engaged and the vehicle lurches forward, the inertia pendulum swings back, partially closing the vacuum line thereby easing the clutch engagement.

With an automatic clutch, the transmission operation is simplified since all that is necessary for the operator to do is to move the selector lever to preselect the gear ratio or series of gear ratios desired and then the actual gear changing is accomplished whenever the accelerator is released.

In order that the preselector mechanism shall have a large margin of operativeness, it is necessary that certain coordinating functions be made certain. Thus, when the transmission and selector lever are both in overdrive, pawl 410 will be in notch 362 of disc 360. If this disc is turned counterclockwise, it will turn disc 374 with it and for every notch that pawl 410 encounters, pawl 424 must not fail to fall into the respective notches in disc 374. In order to make this certain, a small angular lead is given to preselector disc 374. This lead should be about 3° of arc which is adequate if the parts are made with reasonable precision. In the operating mechanism this lead will manifest itself by the fact that pawl 424 will fall into its notch a moment before pawl 410 is completely seated in its V notch.

In a similar manner, the cams on disc 390 must not fail to dislodge pawl 424 from its notches on disc 374. This is provided for by making the cams on disc 390 slightly higher than necessary to lift pawl 424 clear of the notches. As a result of this additional height, pawl 424 will release the notches a moment before lug 402 strikes pin 388 and stops the relative motion of the discs. These structural precautions insure that the preselector mechanism will have a margin of operativeness to compensate for normal wear.

A different modification of the preselector mechanism is shown in Figs. 21 to 24. For convenience, this will be henceforth designated as modification B. In this structure, the three preselector discs 360, 374 and 390 and associated mechanism is identical to the discs earlier described in modification A (Figs. 8 to 13). The structure differs principally in that the preselector pawl 438 of the former modification may be omitted entirely or modified in its application. Instead, there is a governor driven from the mainshaft (Fig. 21), which governor progressively withdraws a pin from a series of notches on the selector cylinder. This governor serves in lieu of the preselector pawl and the stepwise upchange produced thereby.

In order to accommodate the governor assembly, the outer casing is enlarged somewhat to provide space for placing gear 550 on the mainshaft 100. The gear is spaced between the casing and the primary spacing sleeve 232 and overdrive sleeve 112. The gear is held in position on the shaft by set screw 552.

The governor shaft assembly is held in position on the casing by means of supports 562, 564 and 566. The assembly 556 consists of a shaft and the integral gear 557 which meshes with main gear 550. The shaft is journalled in the split bearings 558 and 560 which are, in turn, held in supports 562 and 564. The upper end of the assembly includes the crossbar yoke 580 which supports the flyball weights 584 to 586. These are pivoted at 588 and 590 in the yoke by pins 592 and 594. The center of the assembly is hollow to admit the governor pin 568. This pin is spring biased at 574 against washer 578. Section 572 of the governor pin is square and passes through a square hole in support 566. In this way, the governor pin is prevented from turning and any relative motion occurs between the flyball weights and disc 570. To accommodate this motion, disc 570 may conveniently be mounted on ball bearings. There is no relative motion between support 564 and washer 578, thus making the positioning of spring 574 possible.

The governor pin is positioned so that the top surface of the pin coincides with the center of selector cylinder 320. This cylinder has an enlarged extension (Fig. 22), within which is cut a slot having three notches at varying depths. The slot covers an effective arc of 120° or more and is so positioned that in the extreme clockwise position of the preselector cylinder (Fig. 21), which corresponds to the reverse position, there will be no interference between the pin and the end of the slot. Approximatly 60°+ clockwise, there is a first notch 606 which corresponds to the low position. At intervals of 30° there are two additional notches 608 and 610 which correspond to the intermediate and high positions of the selector cylinder respectively. In its extreme position, shown by the dotted lines in Fig. 21, the governor pin is withdrawn to the point where stop washer 579 strikes support 566. At this point, the governor pin just clears the surface of cylinder 320 and permits the selector cylinder to move into overdrive position.

Figures 21, 22, 23, 24:
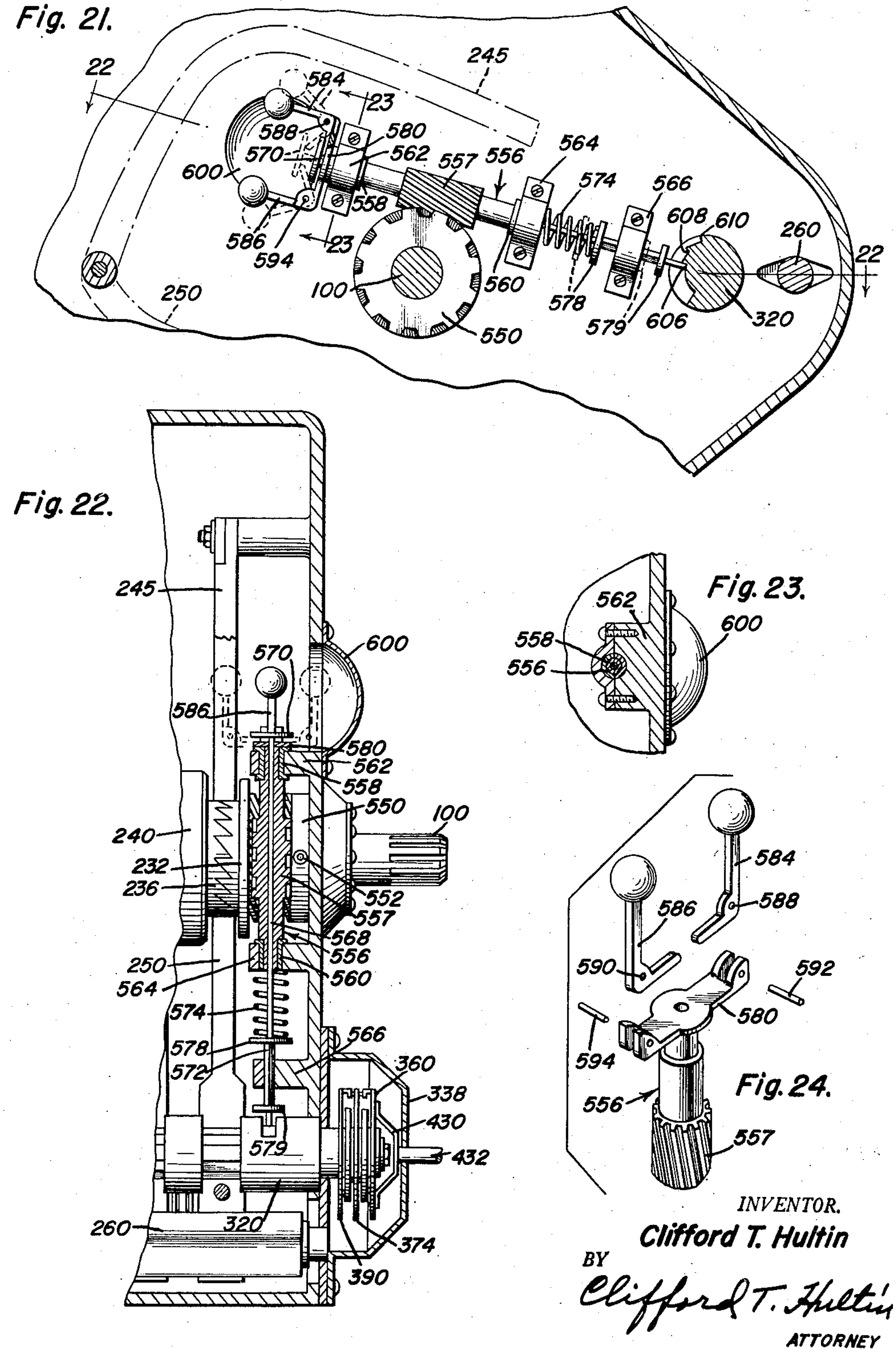
Fig. 21 shows a governor control for determining the preselection of gear ratios.
Fig. 22 is a section along 22 in Fig. 21.
Fig. 23 is a section of the bearing along 23, 23 in Fig. 21.
Fig. 24 is an exploded view of the governor and drive pinion of Fig. 21.

In operating a vehicle equipped with this modification B (Figs. 21 to 24), of preselector mechanism, the gear changing is carried out precisely as indicated under modification A (Figs. 8 to 13), earlier described. To recapitulate, assuming that the selector cylinder and selector level are in neutral and it is desired to reverse the vehicle, the selector lever is placed in reverse and the clutch pedal 14 is actuated to bring the transmission into reverse. When it is desired to proceed forward, the selector lever is moved into high or overdrive. The preselector mechanism will then bias the selector cylinder 320 toward the higher gear ratio. In Fig. 21 it means that the cylinder will be biased counterclockwise, and since the vehicle is standing still, the governor pin will be fully extended and will stop the cylinder from rotating beyond notch 606. This corresponds to the low position of the cylinder, and in order that higher gear ratios shall be reached, it is necessary for the vehicle to move at such a rate of speed that the governor pin is withdrawn beyond the level of the respective notches. By way of illustration, the respective notches may be made of such depth that the governor will withdraw the pin from notch 606 at five miles per hour; from notch 608 at fifteen miles per hour; and from notch 610 at thirty miles per hour. This means that with a selector lever setting in overdrive, the gear ratio in which the vehicle is operating may be changed from low into intermediate at five miles per hour, into high at fifteen miles per hour, and into overdrive at thirty miles per hour by operating the clutch pedal 14 when the vehicle reaches or exceeds these speeds. If the clutch is operated prior to reaching these speeds, no gear changing will take place and conversely, if the vehicle is speeded up to say fifteen miles per hour in low, it will skip intermediate entirely and go directly into high. Thus, instead of the stepwise upchanging that was characteristic of modification A (Figs. 8 to 13), of the preselector mechanism, this modification B (Figs. 21 to 24), acquires certain flexibility of operation not inherent in the former. One situation will suffice to illustrate this. Suppose that a vehicle stop is contemplated, as when approaching a stop light. When a down and up change of the selector lever is registered, modification A (Figs. 8 to 13), would store up the downchange plus the stepwise upchange. In order to erase the latter, it would be necessary to operate the clutch pedal for each gear ratio and although each gear need not be actually engaged, there would have to be repeated depression of the clutch pedal 14 at the outer extremity of its travel to allow the selector cylinder to regain its former position.

In the present modification B (Figs. 21 to 24), when the selector lever is changed down and up, a preselection is also registered, but will become effective only if the vehicle has slowed down to the point where a lower gear ratio is indicated by the governor. Thus, if after a down and upchange by the selector lever the vehicle is not slowed down, operating the clutch will not bring about any gear change since the selector cylinder will merely flip back and up again to its original position. This occurs because the speed of the vehicle holds the governor pin withdrawn to the point where it will not intercept any of the notches in the selector cylinder. In the event that the vehicle is partly slowed down, the governor pin will extend to a point where it will intercept one or the other of the notches above low. Under these circumstances, when the clutch is operated the transmission will automatically change down to some lower ratio namely, intermediate or high. The governor controlled mechanism B (Figs. 21 to 24) is, accordingly, a means for accomplishing stepwise upchange controlled by the speed of the vehicle.

In modification B, the transmission will not go back to neutral, but to low. When it is desired to go back to neutral, it can be accomplished by combining preselector pawl 438 together with the governor mechanism described. In that case, however, only one notch is placed in the preselector cylinder 320. This corresponds to the neutral notch 530. When this combination is utilized and a down and upchange is accumulated, the mechanism will go into neutral on the first movement of the clutch pedal 14. On subsequent movements of the clutch pedal 14, there will be an upchange to a gear ratio which is dependent on the speed of the vehicle. Thus, a combination of the preselector pawl and the governor combines features of both the A and B modification of the mechanism.

Instead of using a centrifugal governor to withdraw the pin in embodiment B, the invention contemplates the interchangeable use of a hydraulic cylinder to accomplish the same purpose. This mode of operation and structure will become clear as the next modification is described.

Figures 25, 26, 27, 28, 29, 30:
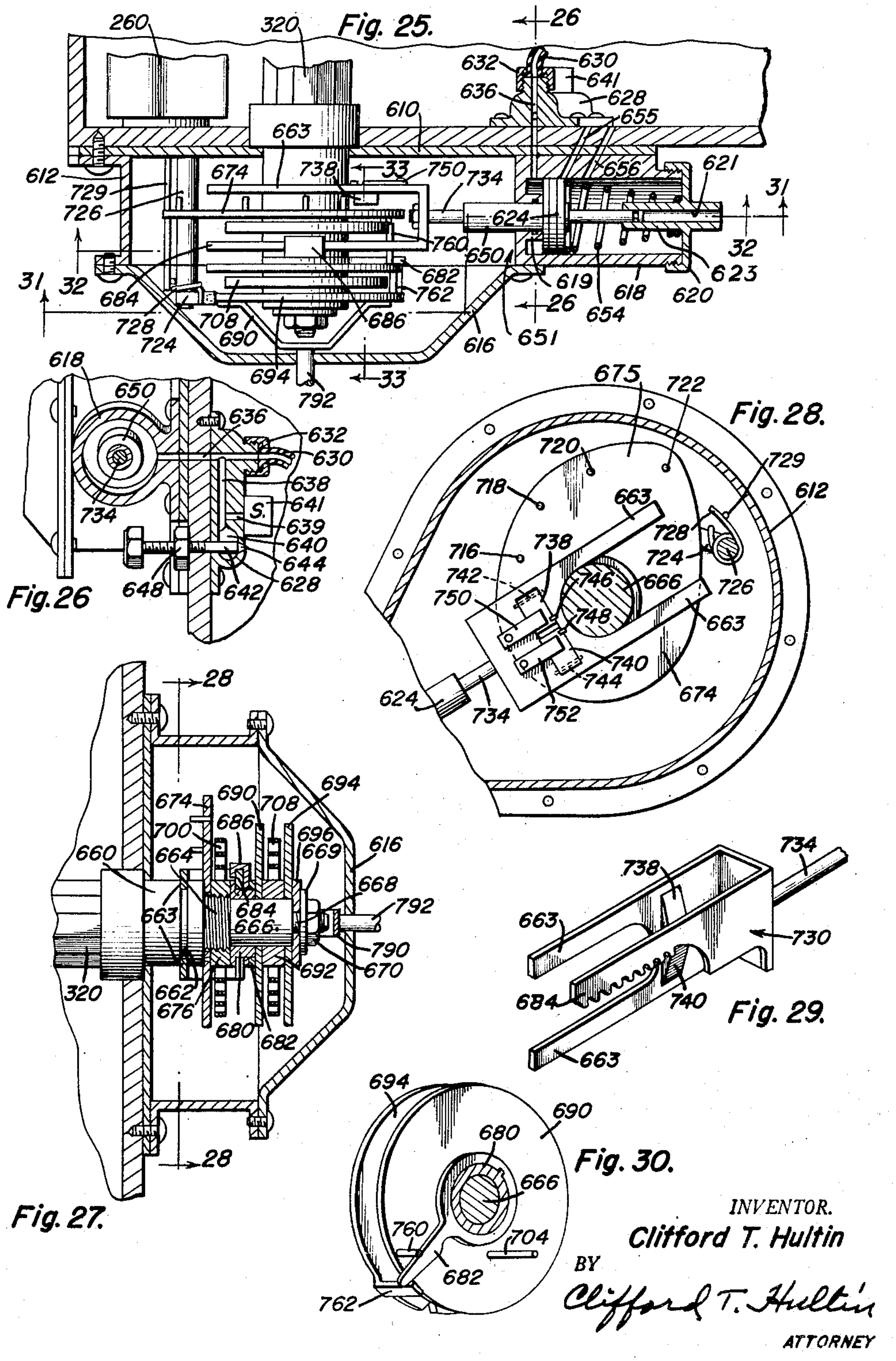
Fig. 25 is a top sectional view through the casing of the automatic preselective mechanism along 25, 25 in Fig. 31.
Fig. 26 shows a section along 26, 26 in Fig. 25.
Fig. 27 is a sectional view of the automatic preselective mechanism along 27, 27 in Fig. 31.
Fig. 28 is a section along 28, 28 in Fig. 27.
Fig. 29 is a perspective of the preselector drive yoke.
Fig. 30 is a perspective of the two outer discs of the automatic preselective mechanism.

This third type of preselector mechanism is shown in Figs. 25 to 35 and will henceforth, for convenience, be designated as modification C. It is composed of three discs 674, 690 and 694 assembled on the selector cylinder shaft extension. Disc 674 is attached to the shaft by means of threaded spacing washer 676. It is further fixed in position by means of a lug similar to 404 in Fig. 11. Following the spacing washer there is a floating segmental gear and spacer 680. This gear has a gear pointer 682 fitted thereto (Fig. 30). Next, there is the floating disc 690 followed by a floating spacing washer 692 and then the outer preselector disc 694. The end of the shaft is secured by spacing washer 696 and nut and washer 669 and 670 in the same manner as was done in embodiment A (Figs. 12 and 13). Disc 694 is equipped with 6 V-notches spaced 30° apart. Pawl 724 on support 726 rides in these notches. The pawl is biased by spring 728 which is backed up by stop pin 729. Disc 674 and 694 are linked to the central disc 690 by spiral springs 700 and 708. This structure is a duplicate of that shown in Figs. 10 and 11 as far as the springs are concerned. Pin 702 is attached to disc 674 and pin 704 to disc 690. The latter pin extends on each side of the disc sufficiently far to permit the spiral springs to be attached thereto. Central disc 690 has an additional pin 760 near the periphery thereof which pin projects towards disc 674. This pin serves as a stop for gear pointer 682. There is a lug 762 on disc 694 which lug projects across the edge of disc 690 and intercepts pointer 682 (Fig. 30).

Figures 31, 32, 33, 34, 35:
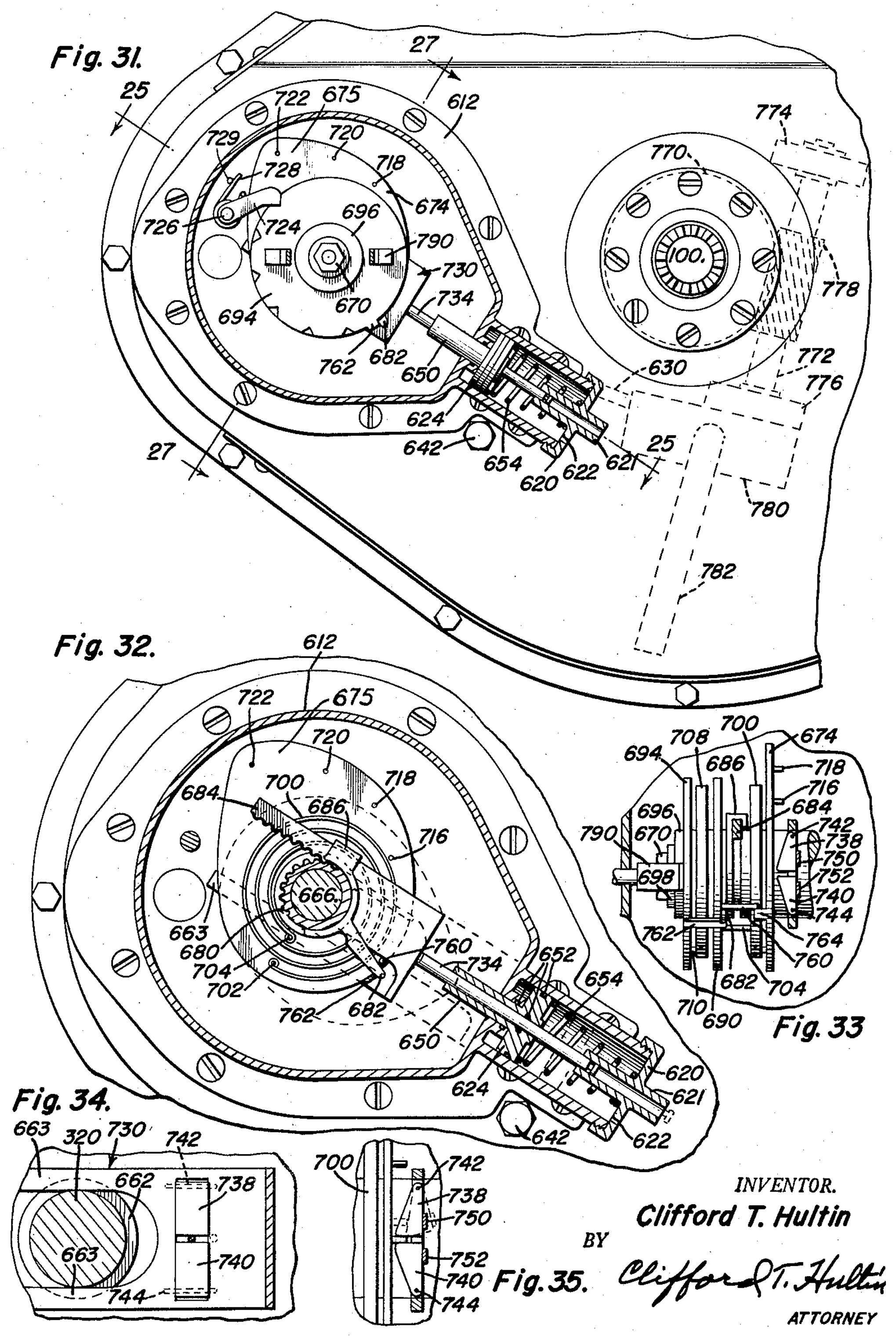
Fig. 31 is a section through the casing of the automatic preselective mechanism along 31, 31 in Fig. 25. It also shows the oil pressure pump which feeds the mechanism.
Fig. 32 is a section along 32, 32 in Fig. 25.
Fig. 33 is a section along 33, 33 in Fig. 25.
Figs. 34 and 35 are detailed views of the yoke of Fig. 29.

There is a circumferential groove 662 in the preselector shaft extension 660. This groove receives the arms 663 of the preselector yoke 730. Rack section 684 of the yoke engages the segmental gear 680. To ensure that rack 684 shall stay in contact with the gear 680, there is provided a positioning guide 686 which encircles the gear spacing washer 680 and loops over the rack. The preselector yoke 730 is equipped with two locating pawls 738 and 740. The latter are fitted in an opening in the yoke and are pivoted at 742 and 744 respectively. The pawls are equipped with bias springs 750 and 752 and stop lugs 746 and 748 (Fig. 28), to ensure that the pawls are continuously biased toward the top as shown in Fig. 35. Guide rod 734 is attached to the yoke by means of a nut as shown. The rod passes through piston rod 650 and piston 624 and into cylinder 618. Inner preselector disc 674 has a cam shaped configuration and is equipped with a series of pins which successively engage the locating pawls 738 and 740 for the various gear ratios. The pins 716, 718, 720 and 722 represent successively the low to overdrive positions of the selector cylinder. The pins are 30° apart on the circle and are spaced at increasing distances from the center of the disc.

The hydraulic cylinder 618 has a cover 620 which is screwed on to the cylinder. This cover has an opening 621 for the guide rod 734, and a drain 622 to prevent accumulation of oil in the end of the cylinder. Piston 624 has an integral piston rod 650 which slides through a packing in the base of the cylinder. The piston itself has a packing, as has the opening in the piston, to receive guide rod 734. All these packings are identified as 652. The entire piston is biased toward the base of the hydraulic cylinder by means of spring 654, which spring is sufficiently stiff to overcome the tension of springs 700 and 708. The guide rod 734 passes through the piston and piston rod and into the hole in the cover. It is free to move longitudinally except as it is restrained by the yoke striking the end of the piston rod. The piston itself is free to move within the limits set by the projection 619 at the inner end of the cylinder and the projection 263 on the cover of the cylinder.

The hydraulic cylinder is supplied with oil under pressure from a gear pump 780 (Fig. 31). This pump is driven from a mainshaft gear 770 which is similar to gear 550 used for the governor drive in embodiment B (Figs. 21 to 24). The pump shaft 772 is supported in bearing supports 774 and 776 and has an integral gear 778 driving the shaft. Intake pipe 782 takes oil from the bottom of the casing and discharges it under pressure into the discharge line 630. This line terminates in compression fitting 632 on the bleeder valve casting 628. A hole passes through this casting and the wall of the transmission casing and into the hydraulic cylinder behind the piston. Entrance of oil behind the piston forces the piston outward to the right (Fig. 25) against the compression spring 654 until it strikes the internal projection on the cover. At this time, the end of the piston rod 624 will be even with the casing. The casting 628 has a lateral by-pass 638 which leads into a chamber 640. This chamber is fitted with a needle valve bleeder 642 closing aperture 644. This valve stem extends outside the casing and is held in place by lock nut 648. When the vehicle is running, oil pump 780, which is a positive displacement pump, generates oil pressure which would quickly rise to extreme values. Bleeder valve 642 is opened to bleed the oil and to create a hydraulic system wherein the pressure generated is a function of the speed of the vehicle. By regulating the bleeder valve opening, which can be done from the outside of the casing, a setting can be attained wherein the piston is completely pushed back in the cylinder at a given vehicle speed. Beyond this point, increase in vehicle speed would have no effect on the mechanism.

With this description of embodiment C (Figs. 25 to 35) we are ready to consider the operating characteristics of a vehicle equipped with such a transmission. We shall assume first that the transmission as well as the selector lever is in neutral. In that case, lug 762 of disc 694 holds gear pointer 682 up against pin 760 of disc 690 and the latter in turn contacts lug 764 on disc 674. When it is desired to reverse the vehicle, the selector lever is placed in reverse and the clutch is operated. When the selector lever is moved into reverse, disc 694 and with it disc 690 are moved 30° counterclockwise, viewed from the ends of the shaft (Figs. 25, 27, 31). This motion also turns gear pointer 682 and with it the segmental gear 680. In the process of rotating, this gear moves rack 684 and yoke 730 to the left until the bottom of the yoke strikes the shaft and the segmental gear as seen in Figs. 28 and 32. At this point also, pin 760 just clears the skirt of the yoke as seen in Fig. 32. Since the selector cylinder and the inner disc 674 cannot move, coil spring 700 must absorb the angular displacement. When the clutch is operated therefore, the selector cylinder 320 is released and it immediately turns counterclockwise 30° to reverse.

When it is desired to proceed forward, the selector lever is moved up to high or overdrive, as was done in the case of embodiments A and B. Since disc 690 cannot move due to pin 760 striking lug 764, coil spring 708 must absorb the angular displacement. When the clutch is operated, therefore, the selector cylinder is released and together with discs 674 and 690 promptly rotate clockwise until pin 716 passes over and depresses pawl 738 to fall into position between pawls 738 and 740. This occurs because as these discs turn clockwise, gear 680 and gear pointer 682 turn with them and therefore move the yoke to the right until pawls 738 and 740 coincide in radial position with the pin 716. At this point, if yoke 730 rests on piston rod 650, further movement of the selector cylinder and, therefore, further upchanging is impossible until the piston and piston rod are moved outward by oil pressure. This situation obtains because the tension of coil spring 654 is greater than the tension of spring 708 which is presently in opposition thereto. As the clutch is operated and the vehicle starts forward in low, oil pressure is generated and the piston moves outward toward the end of the cylinder thereby compressing spring 654. When the piston has moved outward to the extent that disc 674 can turn another 30°, pin 716 will have been released from and pin 718 will be able to move into position between pawls 738 and 740. If the clutch is not operated and the speed is increased further, the piston will continue to move outward until preselector disc 674 is free to move 60° instead of 30°. In that case, pin 720 instead of pin 718 will fall between pawls 738 and 740 and the transmission will skip intermediate and go directly into high upon operation of the clutch. As shown in the drawings, the transmission cannot readily skip more than one gear ratio at any time because the distance between pins 760 and 704 (Figs. 30 and 32) is only 60°+. This limits pointer 682 to 60°+ wholly free movement and therefore limits the selector cylinder to this same movement or a two step gear ratio change. When a certain vehicle speed has been reached, the oil pressure will build up to the point where the piston is moved completely to the right. At this time, yoke 730 is free to move to its extreme position and the transmission is then free to move into overdrive. Thus we see that the principle used in upchanging is to move the selector lever up to the highest gear ratio desired, thus coiling up spring 708 and applying this bias to the preselector mechanism. In order that the change may take place, it is necessary for the segmental gear 680 to turn clockwise and the yoke 730 to move to the right. The yoke cannot move beyond low gear position, however, unless the piston and piston rod is moved out of the way. The latter, in turn, can only occur as a result of vehicle motion building up the oil pressure to move the piston. Accordingly, the upshift is dependent on vehicle motion in the same way as it was in the case of embodiment B (Figs. 21 to 24). In the present embodiment C, however, pins 716, 718, 720 and 722 serve in lieu of notches 606, 608 and 610 (Fig. 21) or notches 532, 534, 536 and 538 (Fig. 16) for locating the selector cylinder. Moreover, in embodiment C as in embodiments A and B, the gear ratio of the transmission can never exceed that of the selector lever setting. For that reason, a downchange can always be produced by moving the selector lever down and operating the clutch pedal.

A further step in an analysis of preselector mechanism C is to consider what takes place when the vehicle is in a high or overdrive gear ratio and is slowing down. When the vehicle is in overdrive, for instance, yoke 730 is in the extreme outward position and rests against the frame. This means that the piston must be completely withdrawn into the cylinder in order that this may take place. When the vehicle slows down, the oil pressure falls and the piston moves inward under the pressure of coil spring 654. Piston rod 624 encounters yoke 730 and pushes this ahead of it. As the yoke moves left, rack 684 turns gear 680, pointer 682, pin 760 and disc 690 (Figs. 30 and 32). Since the position of disc 694 is fixed by the position of the selector lever and disc 674 is prevented from turning by the fixed position of the selector cylinder, coil springs 700 and 708 must absorb the angular displacement. As the yoke is forced inward, overdrive pin 722 which was resting between pawls 738 and 740 eventually slips beyond the pawls (Fig. 34). If the clutch is now operated disc 674 will turn counterclockwise, viewed as in Figs. 31 and 32, until pin 720 strikes pawl 740, depresses it and slips between the pawls. This means an angular displacement of 30° for the selector cylinder and therefore a downshift of one step. It is to be noted that when one pin slips out from between pawls 738 and 740, the next pin will be in a radial position to fall between the pawls. This is so because the width of the pawls is at least twice the radial distance between pins. In the event that the vehicle is allowed to slow down considerably before the clutch is operated, it is possible to get a two step downchange in the same manner that a two step upchange was possible. With the selector lever in a higher gear and with the vehicle slowing up as already described, both springs 700 and 708 will be wound up. The downchanging effect of winding up 700 has already been described. If the vehicle is again speeded up, the bias of spring 708 will again cause upchanging whenever the piston and yoke move out of the way sufficiently to permit an upchange.

We are now in a position to consider a complete summarizing of the operational characteristics of a vehicle equipped with a preselector mechanism of modification C. As in forms A and B, it is necessary to place the transmission in neutral before starting the engine. Similarly, reverse is entered manually as before. In proceeding in the forward speeds, the selector lever is moved up to the highest gear ratio desired and from then on, the operation of the clutch will produce the necessary upchanging as well as downchanging.

In proceeding forward from a standing start, all that is necessary to do is to accelerate the engine and operate the clutch. Merely by way of illustration, the upchange to intermediate, high and overdrive may well be adjusted to take place at 5, 15 and 30 miles per hour respectively. In that case, upchange to intermediate can be made whenever the vehicle speed reaches five miles per hour. To get to high and overdrive, one must wait until 15 and 30 miles per hour are attained respectively. If the clutch is operated before these speeds are reached, nothing happens and reengagement of the clutch merely reengages the former gear. In this manner, the upchanging with modification C (Figs. 25 to 35), is not unlike that which obtains with modification B (Figs. 21 to 24), since they are both determined by the speed of the vehicle. The two modifications differ however in that C also provides for automatic downchange. When the vehicle is under way and speed is reduced, a downchange can be brought about by merely operating the clutch. Thus, if one is negotiating a hill and speed falls to the point where a downchange is desirable, all the operator needs to do is to operate the clutch to produce the necessary gear change. By the same token, the mere slowing up of the vehicle will not produce a gear change unless the operator so desires. If the vehicle is slowed to a stop, the clutch is disengaged in the same manner that it would be in any manually gear changed vehicle, and when this is done the automatic preselector mechanism immediately places the transmission in low for a new start. Thus, as long as one is standing or moving forward, the selector lever can be left in the high or overdrive position and the preselector mechanism automatically selects the proper operating gear ratio for all occasions. As in modification B (Figs. 21 to 24), it is possible to equip this mechanism C (Figs. 25 to 35), with a preselector pawl 438 and with only one notch on the selector cylinder. This notch will be the neutral notch 530. When modification C is so equipped, it is possible to produce a stop in neutral by moving selector lever down and up as before. Operating the clutch then brings the transmission out of neutral and into low whereupon the automatic mechanism takes over. This modification, with the preselector pawl, may be useful in situations where a prolonged traffic stop is desired, since successive movements of the selector lever down to a lower ratio and up again to a higher ratio then brings the transmission into neutral with the forward automatic operation being available by operating the clutch.

When an automatic vacuum operated clutch is used with this preselector mechanism, the clutch operation described may all be dispensed with and the operator has merely to release the accelerator to bring about the gear change.

Throughout this description of modification C it has been proposed, for purposes of illustration, that upchanges occur at 5, 15 and 30 miles per hour. This involves an uneven spacing of speed increases which must be provided for. This can be accommodated by making the radial spacing between pins 716, 718, 720 and 722 uneven. When this is done, however, compensating adjustments in the pawls 738 and 740 are also necessary. A preferable method is to provide for compensating bleeders in hydraulic cylinder 618. These bleeders may be two simple holes in the walls of the cylinder (655 and 656) and are spaced longitudinally of the cylinder such that 655 is just uncovered by the piston after the intermediate position of the piston has been reached, and 656 is uncovered by the piston immediately after the high position of the piston has been reached. When these holes are uncovered, on the pressure side of the piston, they immediately begin to bleed oil with the result that the piston will be delayed in reaching the next gear ratio position. In other words, the engine and vehicle must travel progressively faster to produce the next higher gear ratio change. Since this is the precise requirement for the irregular spacing of the changes, the placing of the proper size bleeder holes can be made to produce any desired spacing of the changes. Moreover, the bleeder holes 655 and 656 can be equipped with individual needle valves making it possible to adjust the speed spacing of the changes to any desired value. Adjustment of main bleeder valve 642 will move the entire gear ratio changing range up or down but will not alter the interval between changes.

In this preselector mechanism C, certain size and positioning requirements of the parts are necessary in order that the mechanism shall be efficient. First, the hydraulic cylinder must be of such length, between stops, 619 and 623, that when the yoke 730 follows the piston, it will move the mechanism from low to overdrive or a total of 90° of rotation of the selector cylinder. When the piston is at its inner position (Figs. 25, 31, 32) and the yoke 730 rests on the end of piston rod 650, the mechanism shall be in low. When the piston is at its outer extremity resting on the cover stop 623, the end of the piston rod 650 will be flush with the wall of the hydraulic cylinder, and if the yoke 730 is resting on the piston and casing, the mechanism will be in overdrive. In Figs. 25, 31 and 32, the yoke 730 is in its innermost position resting against the selector cylinder (Fig. 28). This position, as well as the neutral position, can only be reached by moving the selector lever to these positions, because the hydraulic piston has no effect on the mechanism below the low gear position.

The pawls 738 and 740 are positioned on the yoke such that when the piston is at its innermost or low position with the yoke 730 resting on piston rod 650, low pin 716 rests between the pawls at the approximate center thereof. The pawls shall be at least twice the width of the radial distance between pins on preselector disc 674 so that when the yoke moves in either direction, the pawls shall hold the pin between them for a time sufficient to enable the rack to wind up one of springs 700 or 708 sufficiently to turn the selector cylinder and disc 674 through 30° into a new position, the moment the pin is free of the pawls. Accordingly, whenever a locating pin slips out of the end of the pawls, there is always enough spring bias stored up to snap the cylinder around and cause a new pin to slip into position between the pawls. This serves as a locating feature and insures that the selector cylinder shall always stop in the various positions and not be stranded between them. The width of the pawls and radial distance between pins is also correlated with the size of gear 680. The basic requirement is that as the yoke travels a distance half the width of the pawls, one or the other of springs 700 and 708 shall be wound up at least 30°, or enough to produce a one step change.

As a specific illustration of the operation of the automatic preselector mechanism, we shall assume that the vehicle is in intermediate and is being speeded up. Yoke 730 will move outward to the right to the point where the intermediate pin 718 slips off pawl 740 and moves clockwise (Fig. 32), the high pin 720 coming down will hit pawl 738, depress it and lock in between the pawls approximately in the center thereof. Fig. 34 shows this central position for the low pin. If now the vehicle is slowed up, yoke 730 moves left and the high pin slips off the right side of pawl 738, moving counterclockwise. The intermediate pin coming up strikes pawl 740 approximately in the center and slips into place. These illustrations show how the preselector mechanism moves from one position to the other in accordance with the movement of the hydraulic piston and the speed of the vehicle.

Figures 46, 47, 48, 49, 50, 51, 52, 53, 54, 55, 56, 57, 58:
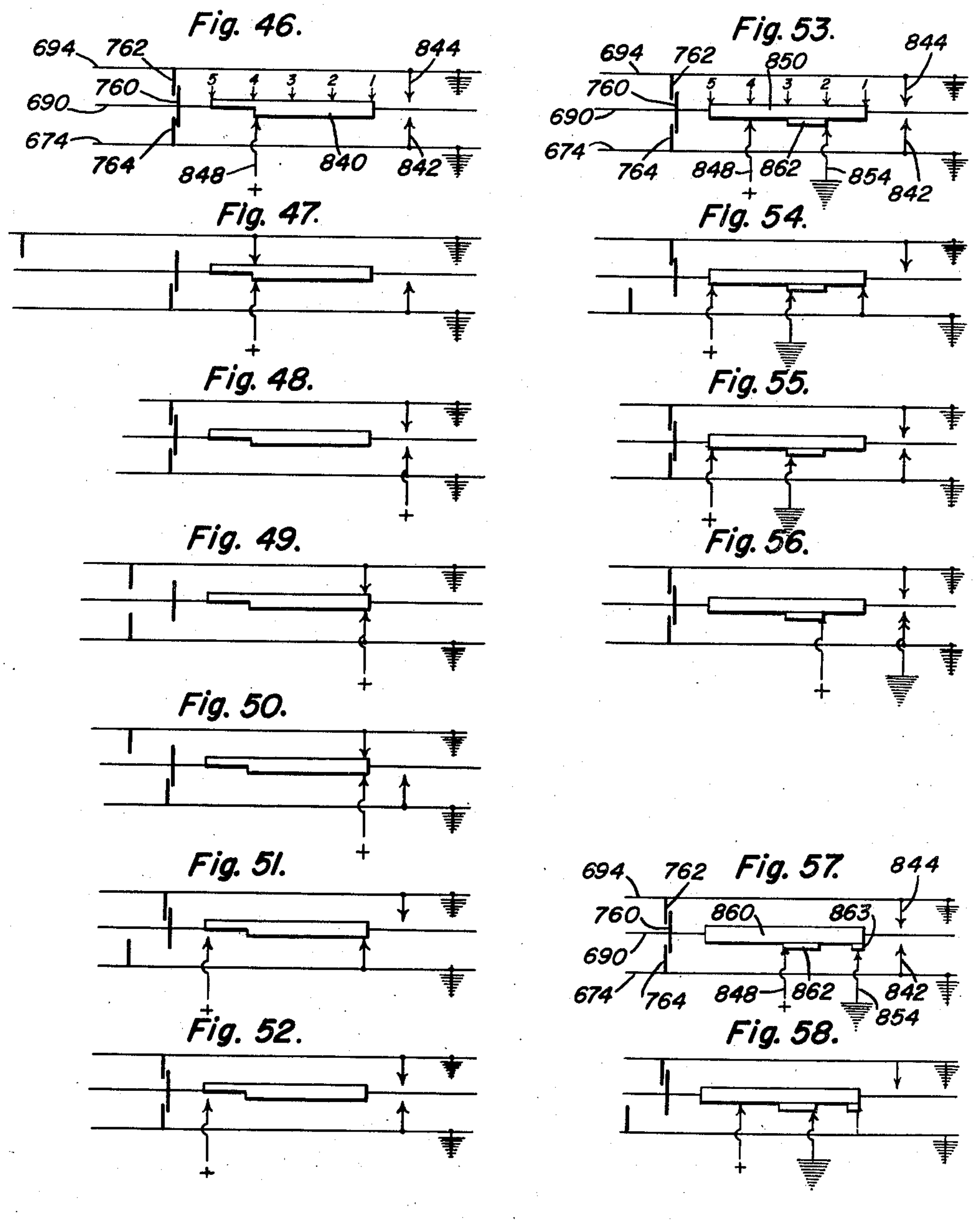
Figs. 46 to 52 are schematic views of different positions of the elements of a free-wheeling selector circuit and showing the five positions on the segment.
Figs. 53 and 56 are schematic views of different positions of the elements of another type of free-wheeling selector circuit and showing the five positions on the segment.
Figs. 57 and 58 are schematic views of two positions of the elements of a third type of free-wheeling selector circuit.
Figure 59:
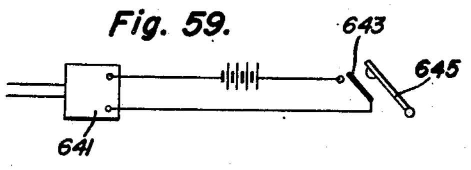
Fig. 59 is a schematic view of a circuit for bringing about a gear ratio reduction by depressing the foot accelerator.

From this discussion, it will be evident that the downchange from high to intermediate, for instance, occurs at a lower speed than the corresponding upshift from intermediate to high. Under some circumstances of traffic, this is desirable as it permits traveling in high gear in slow traffic below 15 miles per hour. Under other driving conditions, it is desirable to be able to downchange at a somewhat higher speed than that at which the corresponding upchange occurred. An example of the latter are the conditions obtaining when climbing a hill or attempting to pass in traffic. Under both of these conditions, it may be desirable to downchange from overdrive to high at a speed considerably above 30 miles per hour, or to downchange from high to intermediate at a speed above 15 miles per hour. This can be brought about in this preselector mechanism by the simple expedient of bleeding oil from the hydraulic cylinder, since this process automatically causes the mechanism to indicate a lower gear ratio. The means of achieving this bleeding is shown in Figs. 26 and 59. Fig. 26 shows a bleeder open 639 and a solenoid operated bleeder valve 641 in the hydraulic bleeder valve casting. This solenoid is in turn energized by a circuit and switch 643 which is positioned under the accelerator pedal 645 (Fig. 58). Flooring the accelerator thus operates the solenoid, opening the bleeder valve and thereby permitting a downchange to occur at a speed above normal. It is obvious that such a bleeder can be placed anywhere in the oil line. Morevover, it may be made adjustable to make possible any degree of acceleration of the downchange. This bleeding system permits considerable flexibility of operation. In the event that a vacuum operated clutch is used, all that is necessary to do for normal gear changing is to release the accelerator. Where an accelerated downchange is desired, the accelerator is first floored, after which it is suddenly released, thereby bringing about the downchange.

Figure 36:
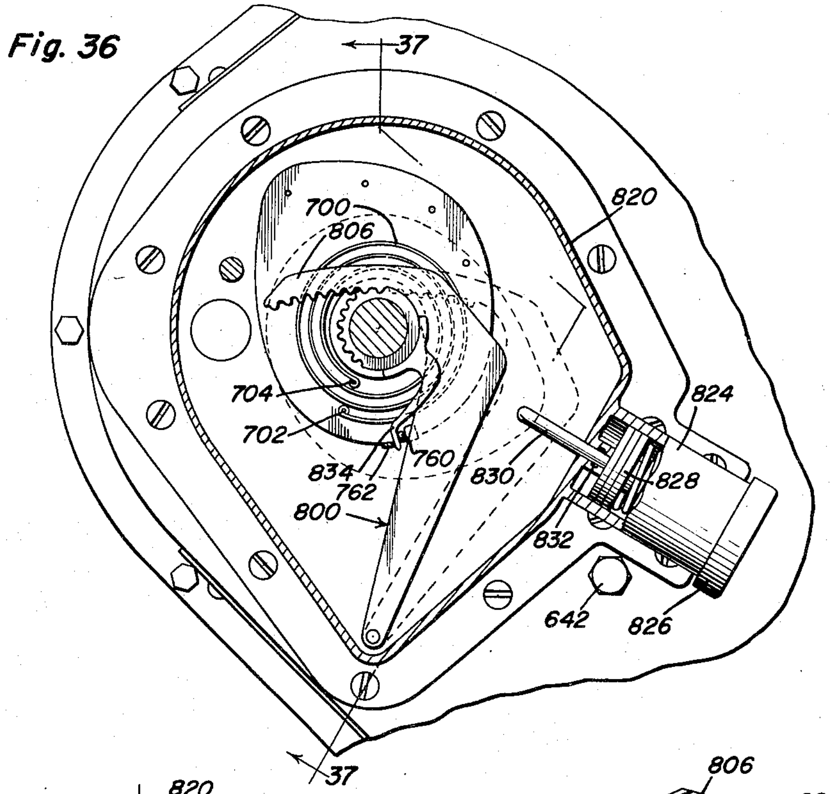
Fig. 36 is a sectional view of another modification of the automatic preselective mechanism along 36, 36 in Fig. 37.
Figure 37:
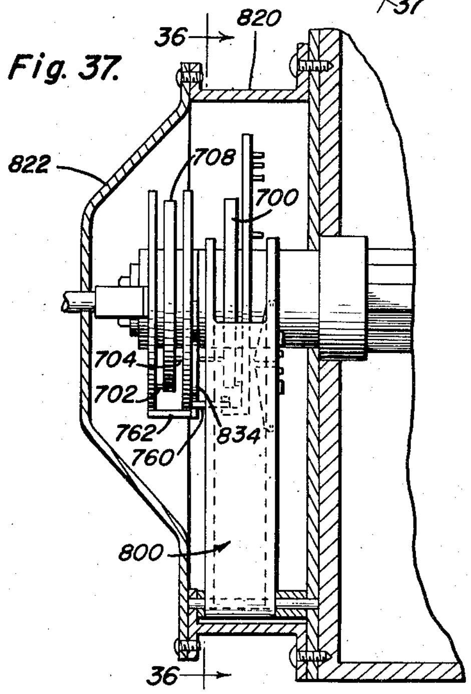
Fig. 37 is a sectional view along 37, 37 of Fig. 36.
Figure 38:
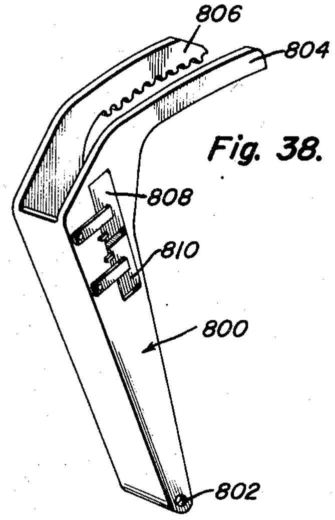
Fig. 38 is a perspective of the pivoted selector yoke of Figs. 36 and 37.

A fourth modification D, of the preselector mechanism, is shown in Figs. 36, 37 and 38. This modification is a duplication of modification C in operation, and the structure is basically similar except that instead of a sliding preselector yoke 730, there is utilized a pivoted preselector yoke 800. This type of yoke permits a simplification of structure in some respects since there is no need for the guide bar 663 of yoke 730, nor is there need for the positioning guide 686 to hold the rack in contact with the gear 680. Likewise, the preselector yoke guide rod 734 becomes unnecessary. All these positioning elements in modification C are rendered unnecessary in modification D by the pivot 802 which automatically positions the yoke at all times. Since the yoke travels in an arc rather than a straight line, however, certain compensating structural alterations must be made. Pawls 808 and 810, in modification D, correspond to pawls 738 and 740 in modification C, and travel in an arc rather than a straight line. For this reason, certain compensations must be made in pin location to insure that the selector cylinder 320 moves 30° for each gear change. Locating pins corresponding to pins 716 and 722 must be spaced somewhat irregularly so that when the respective pins enter the pawls, the selector cylinder will, in fact, have moved 30°. The hydraulic cylinder 824, in modification D, is somewhat simplified since there is no guide rod passing through the piston 828 and piston rod 830. The length of travel of the piston is again such that it will actuate the mechanism from low to overdrive and back. The hydraulic cylinder is otherwise provided with the same system of bleeders as discussed under modification C. Another structural difference between modification C and D is that in D, gear pointer 834 is curved rather than straight. This is purely for clearance purposes. Stop pin 760 and associated lug 762 have been moved toward pin 702 for the purpose of clearing the arm of the pivoted yoke, hence in order that gear pointer 834 shall clear central pin 704 as well as stop pin 760, it is curved as shown. In general, it can be stated that the clearance problems in modifications C and D are different and this accounts for the different positioning of parts on the circumference of the preselector discs. The functioning of the parts is the same and the discussion of operation previously given for modification C (Figs. 25 to 35) is equally applicable for modification D (Figs. 36 to 38).

Figures 39 to 57 are directed to an electrical solenoid actuating system and associated structure which is calculated to make the automatic operation of the transmission more flexible. In discussing the operation of the preselective mechanism of modification C (Figs. 25 to 35), it was emphasized that by utilizing a vacuum operated clutch it was possible to render the operation of the transmission essentially automatic. The use of a vacuum operated clutch, however, renders the transmission essentially free-wheeling, in that whenever the foot is removed from the accelerator, the vacuum in the intake manifold rises, the clutch is disengaged and the vehicle free-wheels. This may be objectionable under some circumstances and the electrical mechanism about to be described is calculated to avoid this limitation.

This mechanism permits the clutch to operate only when the transmission is in a gear ratio other than that for which the selector lever is set or other than that which is indicated by the preselector mechanism. Thus, when in the process of upchanging, the clutch will disengage each time the accelerator is released, until the transmission reaches the gear ratio indicated by the selector lever, at which time the clutch will remain engaged and the engine can then be used for braking the vehicle in the usual manner. When the vehicle is slowing up, the clutch will remain engaged and engine braking will be effective until the preselector mechanism indicates a downchange from the selector lever setting. At such time, the clutch will disengage and the vehicle will free-wheel to a stop or until the accelerator is again depressed, when the clutch will engage and the vehicle will proceed forward in the gear ratio determined by the preselector mechanism.

Figure 45:
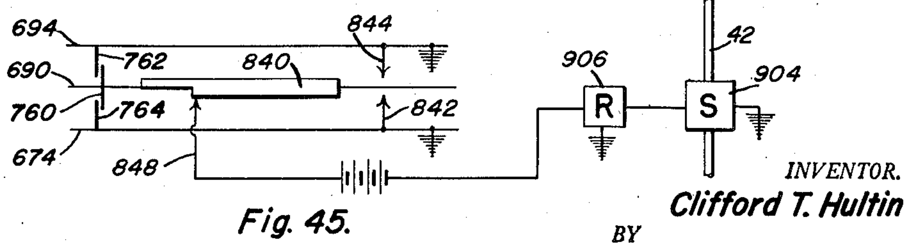
Fig. 45 shows a schematic view of a free-wheeling selector circuit.

The basic schematic of the system is shown in Fig. 45. This shows the vacuum line 42 extending from the intake manifold to the vacuum cylinder. Solenoid valve 904 in this line is normally closed rendering the clutch inoperative except when the valve is opened by the completion of the electrical circuit through the relay 906. The manner in which this circuit is completed is accordingly the principal subject matter of the drawings and the following description.

Figure 39:
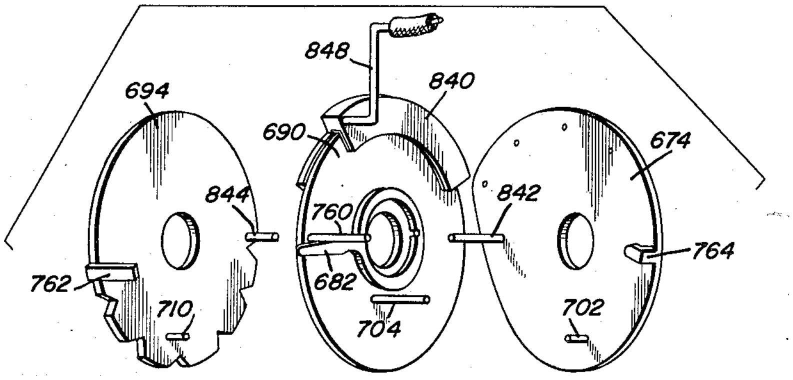
Fig. 39 is an exploded view of the three discs in the automatic preselective mechanism of Fig. 25, including a free-wheeling selector circuit.
Figure 40:
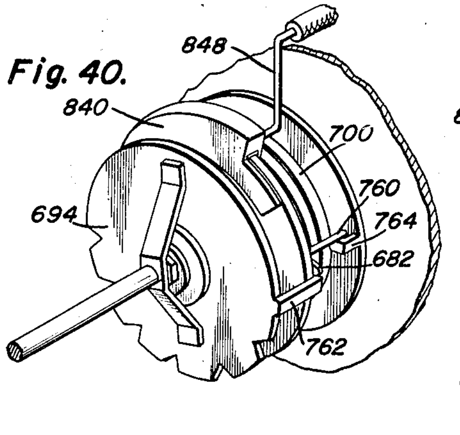
Fig. 40 shows an assembly of the units of Fig. 39 on the selector cylinder shaft extension.
Figure 43:
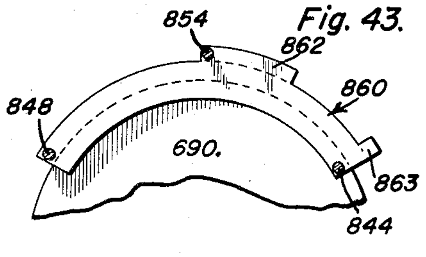
Fig. 43 shows the contact shoe of Fig. 42 in position on the selector disc with contacts in position.

Fig. 39 shows the three preselector discs 674, 690 and 694 in expoded section. The electrical mechanism concerned includes grounded brushes 842 and 844 and contact sector 840. This latter sector is insulated from disc 690 and extends along the circumference of the disc for +90° of arc in whole section and for +30° further in half section. The length of the sector is such that 4 and 5 positional contacts can be made 30° apart on the respective sides (Fig. 46). When the preselector discs are assembled on the selector cylinder shaft extension (Fig. 40), grounded brushes 842 and 844 will contact and sweep the sector on the lowest arc thereof (Fig. 43). Contact brush 848 is fixed with respect to, but insulated from the frame and sweeps the segment on an arc outside of the arc swept by brushes 842 and 844 (Fig. 43). Contact brush 848 is offset as shown to clear the lobe 675 of disc 674. In order to insure that firm contact be made, all brushes may be equipped with spring tips that will produce the necessary contact pressure on the segment.

The schematic position of the sector and various contact brushes is shown in Figs. 46 to 58. In these figures, the three horizontal lines represent discs 674, 690 and 694. The vertical lines at the left represent elements 760, 762 and 764 and the two vertical lines at the right represent contact brushes 842 and 844. Insulated contact brush 848 is indicated as +. Brushes 842 and 844 are located −30° from the end of the sector, so that when either outside disc moves one step or 30°, these brushes will contact the end of the sector in position 1.

For convenience in analyzing the different situations arising within the mechanism, the different positions on the contact segment shown in Figs. 46, 53 and 57 have been labeled 1, 2, 3, 4 and 5. The various contact brushes will occupy a combination of these positions dependent on the position of the selector lever and selector cylinder. The two grounded contact brushes 842 and 844 are attached to the front and rear preselector discs and the one insulated contact 848 is supported on the frame in a fixed position relative to the discs. In order that the vacuum operated clutch shall be operative, there must be a completed electrical circuit. This requires that at least one grounded contact brush and the live contact brush shall touch the insulated sector at the same time.

The Figures 46 to 57 represent three different modifications of the electrical mechanism. Figures 46 to 52 represent different situations of selector lever and transmission settings in the first modification. Figs. 53 to 56 represent a series of different settings in the second modification, and Figs. 57 and 58 represent two settings within the third modification of the system. No effort is made to give an illustration of every possible combination of selector lever and transmission setting within each modification, hence, reference will be made interchangeably to settings within the several modifications.

Figs. 45 and 46 show a schematic view of the mechanism when both the selector lever 472 and the transmission and therefore the selector cylinder 320 are in neutral. Under these circumstances, brushes 842 and 844 do not contact the sector. Hence, there is no electrical circuit from ground through the relay. The valve 904 is accordingly closed and the vacuum operated clutch is inoperative.

Fig. 47 shows the mechanism when the selector lever 472 is in overdrive and the transmission is in neutral. Here grounded brush 844 contacts the sector in position 4 as does the insulated brush 848. A closed circuit accordingly obtains and the vacuum operated clutch will be operative.

Fig. 48 shows the mechanism when the selector lever is in overdrive and the transmission is also in overdrive. This is the situation that obtains after the changes preselected in Fig. 47 have been completed. In this case, none of the contact brushes touch the sector, hence the is an open circuit and the vacuum operated clutch is i operative.

Fig. 49 shows the mechanism when the selector lev and transmission are in overdrive, but due to slowi up of the vehicle, the hydraulic mechanism has rotat disc 690 back 30° or one position. All contact brush are in first position and a closed circuit is establish through grounded brushes 842 and 844 to the sect and insulated brush 848.

Fig. 50 shows the mechanism when the selector lev is in overdrive and the transmission is in high. In oth words, it shows the situation obtaining when a dow change is made from that shown in Fig. 49. He grounded contact brush 844, as well as insulated co tact brush 848, are in position 1. After this change, the is still a closed circuit and the clutch will be operati to upchange again.

Fig. 51 shows the mechanism when the selector lev is in reverse and the transmission is in neutral. There still an open circuit, hence the shift to reverse must b made by manually operating the clutch. Whenever th selector lever is in reverse, the insulated contact brus 848 is in position 5 on the half section part of the secto and hence, out of contact with the sector, the circuit wi then always be open irrespective of the position of th selector cylinder. The result is that reverse must be e tered by a manual operation of the clutch. Fig. 52 show the mechanism of Fig. 51 after the change has bee completed.

Summarizing the situations shown in Figs. 46 to 5 under driving conditions, we find that whenever a vehicl is standing with the transmission and selector lever i neutral, the vacuum operated clutch is inoperative. Whe the selector lever is moved up, the clutch immediatel becomes operative to bring about these preselected u changes (Fig. 47). In the same manner, when the u changes are completed, the clutch becomes inoperativ during driving conditions with the result that there is n free-wheeling and the engine can be used for braking th vehicle (Fig. 48). If the vehicle is allowed to slow u engine braking takes place until the speed is reduced t the point where the mechanism indicates a downshi (Fig. 49). The moment this occurs, the electric circuit i closed and the clutch becomes operative and brings abou the downchange. The transmission automatically down changes into high, but since the circuit is closed the clutc remains disengaged if the accelerator is not depressed As the vehicle again slows down, a further downchang takes place to intermediate and ultimately to low. Durin all this time that downchanging has taken place, the clutc has remained disengaged and the vehicle has been free wheeling. If it is desired to use the engine for brakin during this slowing up operation, it can be done by mov ing the selector lever down to a lower gear ratio. As practical matter, it is not necessary to move the selecto lever below high, since this will supply engine brakin down to about 10 miles per hour, which is about the spee at which a downchange from high to intermediate wil take place.

Figure 44:
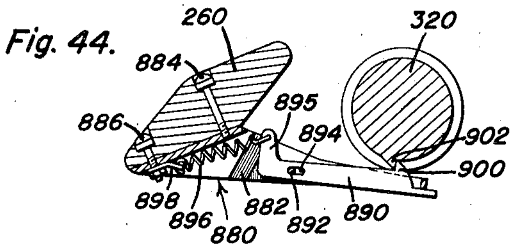
Fig. 44 shows a control dog similar to Figs. 15, 16 and 17 but having a hook terminal.

Since the mechanism of Figs. 46 to 52 makes the vac uum operated clutch inoperative in neutral and reverse it means that when the transmission and selector leve are in a higher gear ratio and the selector lever is move to neutral, the clutch will first disengage, the transmissio will change down and when neutral is reached, the clutc will bleed into engagement in neutral because the electri cal circuit will have been broken (Fig. 46). If instea of moving the selector lever to neutral it is quickly move to reverse, the clutch will not have sufficient time to blee into engagement in neutral and the brake shoes will no stop the selector cylinder in neutral as intended. In stead, the transmission will actually change all the way t reverse with the result that when the clutch bleeds int engagement in reverse, it will be out of control of the accelerator. To avoid this possibility, the clutch cam 260 is provided with a pawl (Fig. 44) which will prevent the selector cylinder 320 from passing neutral without bleeding the clutch into engagement therein. This pawl has the same frame structure 880, as that of Figs. 15, 16 and 17, but the movable member 890 of the pawl of Fig. 44 is in the form of a hook so it will operate to stop a counterclockwise turning of the selector cylinder 320. It also differs in that there is only one notch on the selector cylinder, which notch is in the neutral position. Moreover, the notch is reversed in direction from that shown in Figs. 15 and 16 to enable it to operate with the reversed hook of the pawl 890. The movable pawl member 890 is pivoted on a pin 892 and has an elongated slot 894. Spring 896, which is attached to lug 898, is in tension and biases the movable pawl member upward against the selector cylinder and leftward towards the clutch cam 260. When the selector lever is suddenly turned to reverse, therefore, it means that the selector cylinder 320 turns counterclockwise (Fig. 44). Since the clutch must disengage before the selector cylinder can turn, the disengagement brings hook pawl 890 into position so that the latter is ready to catch the cylinder in neutral as shown in Fig. 44. While the cylinder is thus held by the pawl, the clutch bleeds into engagement and the transmission is ready to go into reverse by manually operating the clutch. By combining the pawl of Fig. 44 with the electrical clutch operating mechanism of Figs. 46 to 52, manual operation into reverse is made possible under all circumstances of gear changing. This pawl is not needed in the modified mechanism of Figs. 53 to 58 since there the automatic vacuum operated clutch is operative in all gear ratios, including reverse.

Figure 41:
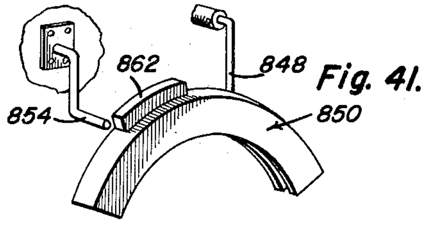
Fig. 41 shows a contact shoe of a free-wheeling selector circuit including two projecting contacts.

Figs. 53 to 56 show the operation of a mechanism which is a modification of that shown in Figs. 39, 40 and 46 to 52. The purpose of this mechanism is to provide for automatic clutch operation in reverse and neutral as well as the forward speeds. The physical structure of the contact sector 850 of this modification is shown in Fig. 41. It consists of a solid sector extending on both sides of the preselector disc for a distance of +120° of arc or five positions. It differs from the modification of Fig. 46 which had only a half contact sector for the fifth position. In addition, this latter modification has an extension sector 862 in the second and third position, which sector is swept by grounded contact brush 854. The contact radius of this sector and brush is outside that of the other brushes (Fig. 43). When the selector lever and mechanism are in neutral, the contact brushes are positioned as shown in Fig. 53. The grounded brush 854 is in position 2 and contacts the end of the extension sector. The insulated brush 848 is in position 4, the same as in the modification of Figs. 46 to 52.

Fig. 53 represents the neutral position of the selector lever and transmission and shows that in this neutral position the clutch will be disengaged since the electrical circuit is closed through grounded brush 854 and insulated brush 848. If the selector lever is moved up to overdrive, corresponding to Fig. 47, the circuit will be closed through grounded brush 844, hence, although grounded brush 854 will break contact with the extension sector at the moment the mechanism goes into low, the ground side of the circuit will be maintained by brush 844.

Fig. 54 represents the neutral position of the transmission with the selector lever in reverse. The electrical circuit is closed, hence the vacuum operated clutch is operative and disengaged.

Fig. 55 represents the same situation with the gear change completed and with the electrical circuit still closed.

Figs. 54 and 55 illustrate the distinctions between this modification and that of Figs. 46 to 52. First, it will be noted that due to the presence of the full sector for the entire 120°, 848 is in contact with the sector in reverse. This makes it possible to maintain automatic clutch operation in reverse, and because sector 862 plus grounded brush 854 supplies the ground in both the neutral and reverse positions (Figs. 53, 54 and 55), it makes the automatic vacuum operated clutch operative in both neutral and reverse.

Fig. 56 represents the preselector mechanism when the selector lever and transmission are in intermediate. Here the insulated brush is in position 2 and all the ground brushes are out of contact with the sector and the circuit is open. The vacuum operated clutch is accordingly inoperative.

Summarizing the various situations of the modification of Figs. 53 to 56, under driving conditions, we find that the vacuum operated clutch is generally operative in the forward speeds as well as neutral and reverse. The transmission therefore takes on a more fully automatic character than that of Figs. 46 to 52, since the clutch need never be manually operated and the vehicle can always be started by merely depressing the accelerator and all up and downchanges brought about by releasing the accelerator. A more detailed analysis of actual driving conditions shows that if the engine is started in neutral, the clutch immediately disengages (Fig. 53). If the selector lever is moved up to overdrive, the vehicle may be started in low by depressing the accelerator and every upchange thereafter will be made by releasing and depressing the accelerator until overdrive is reached. At that time, the circuit will be opened by the fact that brush 844 and inslated brush 848 move off the sector. The vacuum operated clutch, accordingly, becomes inoperative and the engine can be used for braking in the normal manner. When the accelerator is released and the vehicle slows down, disc 690 and sector 840 will move to the right as in Fig. 49. When it has moved 30° or one position, it makes contact with grounded contacts 842 and 844 in position 1. The circuit is completed through insulated brush 848, also in position 1. The clutch will then operate to produce the downchange. At the moment the downshift occurs, the selector cylinder 320 turns and disc 674 moves right 30° or 1 position (Fig. 50), and brush 842 leaves the sector. Brush 844 remains in contact with the sector to maintain the circuit, however. If the accelerator remains released, this stepwise downchanging continues until low gear is reached.

The actual downchanges in the transmission will take place at a somewhat lower speed than the corresponding upchanges; hence, if we assume upshifts at 15 and 30 miles per hour, we may expect the corresponding downchanges at 25 and 10 miles per hour respectively. These actual downchanges are not important while the vehicle is slowing up since the clutch is continually disengaged and the vehicle freewheels down to a stop, after reaching the speed at which the downchanges from overdrive to high occurred. The precise gear ratio in which the transmission is in at the moment, becomes important only when the accelerator is depressed to proceed again in the forward speeds. This free-wheeling below 25 miles per hour can be prevented, and the use of the engine for braking down to a lower speed may be had by moving the selector lever down to high. When this is done, the vacuum operated clutch will be inoperative and engine braking may be had through the high range and down to about 10 miles per hour. This same procedure may be carried down through the intermediate range, but for all normal driving, engine braking down to the lowest speed necessary may be realized by merely placing the selector lever in high.

Figure 42:
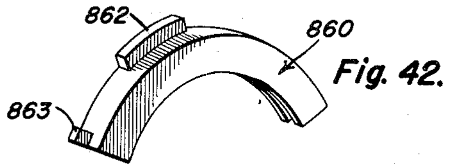
Fig. 42 shows a different modification of a contact shoe of a free-wheeling selector circuit.

Figs. 57 and 58 show a third modification of the electrical vacuum operated clutch control mechanism. The physical structure of the contact sector is shown in Figs. 42 and 43. It differs from the sector of Fig. 41 in having a small extension sector 863 in the 1 position. Thus, the grounded brush 854 sweeps both sectors 862 and 863. The purpose of this extension sector is to maintain a closed circuit in low gear even when the selector lever and transmission are both in low. With this modification therefore, the transmission accordingly always free-wheels in low since the clutch will always be disengaged whenever the accelerator is released.

Fig. 57 shows the mechanism when both selector lever and selector cylinder are in low. The insulated brush is in 3 position on the main sector and the ground brush 854 contacts the extension sector 863. The operation of a vehicle so equipped would differ from the other modifications in that engine braking cannot be carried below intermediate gear. In other words, when the vehicle is slowed down to about 5 miles per hour, it will automatically free-wheel irrespective of the position of the selector lever.

Fig. 58 shows the mechanism when the selector cylinder is in low and the selector lever is in neutral. Here the circuit has been completed by ground brushes 842 and 854, as well as 848, and the transmission accordingly free-wheels.

I claim:

1. In a power transmission comprising driver and driven shafts, a planetary unit with controlled elements for transmitting torque between said driver and driven shafts at different gear ratios, said control elements comprising brake drums attached to different elements of said planetary unit, biased brake bands about said brake drums to thereby engage the different gear ratios, brake band ends having projecting cam follower surfaces and cam means positioned between said cam surfaces to permit the simultaneous disengagement of all the brake bands by rotating said cam means, the improvement which comprises positioning a rotary selector means between a series of oppositely disposed projecting lugs on said brake band ends adjacent said cam means, said rotary selector means incorporating a series of diametral perforations under the respective pairs of projecting lugs of the various brake bands to thereby permit said lugs to fall into the perforations depending upon the angular position of said rotary selector means to thereby effect engagement of the particular brake band with its brake drum, and means for selectively turning said rotary selector means.

2. A power transmission in accordance with claim 1 wherein the diametral perforations in said rotary selector means are arranged in different axial planes.

3. A power transmission in accordance with claim 2 wherein the rotary selector means has one axial plane wherein there are no perforations thereby preventing any brake bands from being engaged.

4. A power transmission in accordance with claim 2 wherein the rotary selector means is a polygon having twice the number of sides +2 that are gear ratios to be engaged.

5. A power transmission in accordance with claim 2 wherein the rotary selector means is in the form of a dodecagon having perforations through 5 of the planes normal to the sides of the dodecagon.

6. A power transmission in accordance with claim 4 wherein the polygon rotary selector means is flexibly connected to a control lever through a preselector means.

7. A power transmission in accordance with claim 1 including preselector means for controlling the rotary selector means to successively engage a series of gear ratios.

8. A power transmission in accordance with claim 7 wherein the preselector means includes three parallel discs mounted on an extension of the rotary selector means.

9. A power transmission in accordance with claim 8 wherein the inner of the three discs is fixedly attached to a shaft extension of the rotary selector means, the remaining two discs being spaced from the inner disc and are rotatably mounted on the same shaft extension, the middle disc being flexibly attached to each of the other discs by means of spiral springs which permit the outer disc to be turned to a desired preselected position, while the inner disc remains fixed in the position occupied by the rotary selector means.

10. A power transmission in accordance with claim 9 wherein the central disc has a stop pin therethrough projecting from both sides of the disc near its periphery and each outer disc has a lug engaging said stop pin.

11. A power transmission in accordance with claim 10 wherein the spiral springs serve to bias the discs so that both lugs engage the stop pin.

12. A power transmission according to claim 9 wherein lugs on the inner and outer discs encounter a stop pin on the middle disc and wherein the spiral springs are so orientated that the lugs on the inner and outer discs are biased against the stop pin on the middle disc and wherein a speed responsive means serves to rotate the middle disc to a position indicating a lower gear ratio as the speed of the driven shaft falls.

13. A power transmission according to claim 12 wherein the speed responsive means serves to rotate the spring biased middle disc to a position indicating a higher gear ratio as the speed rises, said rotation being limited by the position of the outer disc.

14. A power transmission according to claim 13 wherein the outer disc is provided with a series of V-notches corresponding to the various gear ratios, and a spring biased pawl is positioned so as to fall into these notches as the disc is turned.

15. A power transmission according to claim 14 wherein the outer disc is attached to a manual control means whereby the outer disc can be rotated into any gear ratio corresponding to the different notches in the outer disc.

16. A power transmission according to claim 15 wherein the lugs on the inner and outer discs are positioned clockwise of the stop pin in the middle disc and the spiral springs are so orientated that a clockwise rotation of the outer disc winds the spiral spring between the middle and outer discs and a counterclockise rotation winds the spring between the middle and inner discs.

17. A power transmission according to claim 15 wherein the speed responsive means includes a gear sector rotatably mounted on the shaft extension of the rotary selector means, between the middle and inner discs, said gear sector being equipped with a pointer that engages the stop pin on the middle disc.

18. A power transmission according to claim 17 wherein the other side of the pointer engages the lug on the outer disc.

19. A power transmission according to claim 18 wherein the speed responsive means includes a geared rack which engages the geared sector and which turns said sector and middle disc to a lower gear ratio as the speed of the driven shaft falls.

20. A power transmission according to claim 19 wherein the speed responsive means further includes a hydraulic cylinder, piston and piston rod which actuates the geared rack.

21. A power transmission according to claim 20 wherein the speed responsive means further includes a hydraulic pump driven from the driven shaft of the transmission, said hydraulic pump supplying hydraulic fluid under pressure to the hydraulic cylinder, said cylinder being squipped with a pressure responsive valve to permit the pressure to vary according to speed.

22. A power transmission according to claim 19 wherein the inner disc includes a series of pins positioned on uniformed spaced radii of said inner disc, said pins being spaced at progressively greater distances from the center of the disc, said gear rack having positioning means thereon to position and hold said pins as the movement of the inner disc brings the respective pins into alignment with the positioning means.

23. A power transmission according to claim 22 wherein the hydraulic cylinder is equipped with vents which are uncovered by the moving piston to thereby increasingly bleed the hydraulic system as the speed increases.

24. A power transmission according to claim 23 wherein one vent is uncovered as the intermediate gear ratio position is passed and another vent is uncovered as the high gear ratio position is passed.

25. A power transmission according to claim 24 wherein the hydraulic system is provided with an additional vent which, when opened, will partially bleed the system to reduce the effective pressure and progressively raise the speed at which the respective upchanges in gear ratios would occur.

26. A power transmission according to claim 25 wherein the additional vent is of such size that it will bleed the system and reduce the pressure to a point where a downchange will occur without a decrease of speed.

27. A power transmission according to claim 26 wherein the vent is controlled by a solenoid valve which is energized by an electrical circuit.

28. A power transmission according to claim 27 wherein the electrical circuit is completed through a switch that is closed by flooring the accelerator of a vehicle equipped with the transmission.

29. A power transmission according to claim 22 wherein the positioning means includes two opposed latches so positioned that a pin may pass from either direction over either latch into position between the latches to thereby hold the pin and the inner disc in a fixed position.

30. A power transmission according to claim 17 wherein said pointer has an arc of freedom between the stop pin and an inner pin through the middle disc which holds the coil spring to said disc, equal to at least two gear ratio steps.

31. A power transmission according to claim 20 wherein the piston is spring biased to the extended position and wherein hydraulic pressure serves to push the piston into the cylinder against the spring bias.

32. A power transmission according to claim 31 wherein the spring bias of the piston exceeds the bias supplied by the two spiral springs between the discs.

33. A power transmission according to claim 32 wherein the spring bias of the piston serves to push the geared rack so as to turn the center disc in a direction to bias the rotary means toward a lower gear ratio.

34. A power transmission according to claim 33 wherein the geared rack carries a guide rod which passes through an opening in the piston and piston rod, which guide rod is freely movable longitudinally in said piston and piston rod.

35. A power transmission according to claim 19 wherein said geared rack is equipped with a sliding guide to hold said rack in contact with the geared sector.

36. A power transmission according to claim 19 wherein the geared rack is in the form of a pivoted gear sector.

37. A power transmission according to claim 36 wherein the geared sector is internally geared.

38. A power transmission according to claim 37 wherein the inner disc includes a series of pins positioned on uniformly spaced radii of said inner disc, said pins being spaced near the periphery of and at progressively greater distances from the center of the disc and said geared sector having positioning means thereon to position and hold said pins as the movement of the inner disc brings the respective pins into alignment with the positioning means.

39. A power transmission according to claim 38 wherein the positioning means include two opposed latches so positioned that a pin may pass from either direction over either latch into position between the latches to thereby hold the pin and the inner disc in a fixed position.

40. A power transmission according to claim 39 wherein said pointer has an arc of freedom between the stop pin and an inner pin through the middle disc which holds the coil spring to said disc equal to at least two gear ratio steps.

41. A power transmission according to claim 40 wherein the piston is spring biased to the extended position and wherein hydraulic pressure serves to push the piston into the cylinder against the spring bias.

42. A power transmission according to claim 41 wherein the spring bias of the piston serves to push the geared sector so as to turn the center disc in a direction to bias the rotary selector means toward a lower gear ratio.

43. A power transmission according to claim 12 wherein the preselector means is provided with electrical means having a contact segment including an insulated contact means attached to the middle disk which serve to disengage an automatic clutch mechanism whenever the transmission is in a gear ratio other than that indicated by the manual control means or by the speed responsive means.

44. A power transmission according to claim 12 wherein the preselector means is provided with electrical means having a contact segment including an insulated contact means attached to the middle disk whereby an electrical circuit is completed whenever the transmission is in a gear ratio other than that indicated by the manual control means or by the speed responsive means.

45. A power transmission according to claim 44 wherein the electrical means serves to actuate a solenoid valve in the clutch vacuum line when the transmission is in a gear ratio other than that indicated by the manual control means or by the speed responsive means to render clutch operation automatic whenever the electrical circuit is closed and the accelerator is released.

46. A power transmission according to claim 45 wherein the clutch is disengaged by the vacuum in the intake manifold of the engine of the vehicle to which the clutch is attached.

47. A power transmission according to claim 46 wherein the solenoid operated valve, which is actuated by the electrical means, is positioned in the vacuum line to the automatic vacuum operated clutch.

48. A power transmission according to claim 47 wherein the vacuum is applied for disengaging the clutch by releasing the accelerator of the engine.

49. A power transmission according to claim 43 wherein the electrical means includes an insulated sector attached to the middle preselector disc with grounded terminals attached to the inner and outer discs, which terminals sweep the insulated sector.

50. A power transmission according to claim 49 including an insulated live terminal which sweeps the insulated sector in an arc different from the arc swept by the grounded terminals.

51. A power transmission according to claim 50 wherein the insulated sector extends along the middle disc for an arc corresponding to the number of gear ratio positions on the rotary selector means.

52. A power transmission according to claim 51 wherein the insulated sector is partially cut away in one position so that the insulated live terminal fails to contact the sector in this cutaway position.

53. A power transmission according to claim 52 wherein the non-contacting position on the sector corresponds to the position of the central disc when the transmission is in reverse.

54. A power transmission according to claim 53 wherein the insulated sector has a projected sector which is swept by a third grounded brush which is fixed to the frame of the mechanism.

55. A power transmission according to claim 54 wherein the projected sector extends along the insulated sector in an arc of such extent that the third grounded brush contacts the projected sector in two gear ratio positions of the rotary selector means.

56. A power transmission according to claim 55 wherein the positions of contact with the third grounded brush corresponds to the reverse and neutral gear ratios of the transmission.

57. A power transmission according to claim 56 wherein there is a second projected sector in the same arc as the projected sector, which second projected sector is also swept by the third grounded brush.

58. A power transmission according to claim 57 wherein the second projected sector is contacted by the third grounded brush when the transmission is in low.

59. A power transmission in accordance with claim 11, including means for producing step-wise movement of the rotary selector means in one direction.

60. A power transmission in accordance with claim 59 wherein the means for producing stepwise movement of the rotary selector means is a flexible pawl which is attached to the cam means and which engages with notches in the rotary selector means when the cam means is rotated.

61. A power transmission in accordance with claim 60 wherein the outer disc is supplied with a series of V-notches corresponding to the various gear ratios, and a spring biased pawl is positioned so as to fall into these notches as the disc is turned.

62. A power transmission in accordance with claim 61 wherein the outer disc is attached to a manual control means whereby the outer disc can be rotated into any gear ratio corresponding to the different notches in the outer disc.

63. A power transmission in accordance with claim 62 wherein the lugs on the inner and outer discs are positioned clockwise of the stop pin through the middle disc, and the spiral springs are so orientated that a clockwise rotation of the outer disc winds the spiral spring between the middle and outer discs and a counterclockwise rotation winds the spring between the middle and inner discs.

64. A power transmission in accordance with claim 62 wherein the middle disc is equipped with a series of notches and a hook pawl engaging said notches, said pawl serving to hold the middle disc in a position corresponding to a lower gear ratio than that indicated by the shift lever setting as well as the setting of the rotary selector means.

65. A power transmission in accordance with claim 64 wherein the inner disc is equipped with a set of cams of such size that when the lug of this disc engages the stop pin of the central disc, the respective cams serve to contact an extension on the hook pawl to keep said pawl out of contact with the notches in the central disc.

66. A power transmission in accordance with claim 65 wherein the notches on the middle disc and the cams on the inner disc are at progressively greater distances from the center of the discs in a clockwise direction.

67. A power transmission in accordance with claim 66 wherein there are 6 V-notches in the outer disc, 4 noches in the middle disc and 4 cams in the inner disc, said notches and cams corresponding to the neutral, low, intermediate and high gear ratios of the rotary selector means; said notches and cams in all the discs being 30° apart on the circumference.

68. A power transmission in accordance with claim 59, including a speed responsive means to determine the stepwise movement of the rotary selector means.

69. A power transmission in accordance with claim 68 wherein the speed responsive means is a centrifugal governor which is driven from the driven shaft, which governor progressively withdraws a pin from a series of notches on the circumference of the rotary selector means, as the speed increases.

70. A power transmission in accordance with claim 69 wherein the stop pin is central to the governor shaft and wherein said shaft and pin are in line with the axial center of the rotary selector means.

71. A power transmission in accordance with claim 69 wherein the notches on the rotary selector means are spaced apart to correspond to the degrees of arc between gear ratio positions on the rotary selector means, and wherein the distances of said notches from the center of the rotary selector means varies in accordance with the desired speed at which changes into the several gear ratios can be made.

72. A power transmission in accordance with claim 71 wherein there are three notches in the shift cylinder representing respectively, low, intermediate and high gear ratios and wherein said notches are progressively further from the center of the rotary selector means.

73. A power transmission in accordance with claim 69 including a flexible pawl which is attached to the cam means and which engage with a notch in the rotary selector means when the cam means is rotated, said notch corresponding to the neutral position of the rotary selector means.

74. A power transmission in accordance with claim 73 wherein said flexible pawl engages the notch in the rotary selector means when the cam holds the brake bands in a disengaged position.

75. A power transmission in accordance with claim 68 wherein the speed responsive means progressively withdraws a pin from a series of notches on the circumference of the rotary selector means as the speed increases, and including further, a flexible pawl which is attached to the cam means and which engages with a notch in the rotary selector means when the cam is rotated, said notch corresponding to the neutral position of the rotary selector means.

76. A power transmission in accordance with claim 75 wherein the pin is central to the governor shaft and wherein said shaft and pin are in line with the axial center of the rotary selector means.

77. A power transmission in accordance with claim 75 wherein the notches on the rotary selector means are spaced apart to correspond to the degrees of arc between gear ratio positions on the rotary selector means and wherein the distances of said notches from the center of the rotary selector means varies in accordance with the desired speed at which changes into the several gear ratios can be made.

78. A power transmission in accordance with claim 75 wherein there are three notches in the rotary selector means representing respectively, low, intermediate and high gear ratios and wherein said notches are progressively further from the center of the rotary selector means.

79. A power transmission in accordance with claim 75, wherein the radial distance of the respective notches from the center of the rotary selector means determines the speed at which the respective upchanges can be made.

References Cited in the file of this patent

UNITED STATES PATENTS

| | | |
|---|---|---|
| 918,657 | Coffee | Apr. 20, 1909 |
| 918,658 | Coffee | Apr. 20, 1909 |
| 1,418,537 | Cotal | June 6, 1922 |
| 1,691,651 | Furness | Nov. 13, 1928 |
| 1,758,597 | Ford | May 13, 1930 |
| 1,979,742 | Henroid | Nov. 6, 1934 |
| 2,020,404 | Farkas | Nov. 12, 1935 |
| 2,100,748 | Prince | Nov. 30, 1937 |
| 2,173,659 | Patterson | Sept. 19, 1939 |
| 2,177,428 | Fleischel | Oct. 24, 1939 |
| 2,343,955 | Cotterman | Mar. 14, 1944 |
| 2,348,980 | Johnson | May 16, 1944 |

FOREIGN PATENTS

| | | |
|---|---|---|
| 11,999 | Denmark | Mar. 19, 1909 |
| 104,723 | Great Britain | Mar. 13, 1917 |
| 436,562 | Great Britain | Oct. 16, 1935 |
| 553,497 | France | Feb. 12, 1923 |